(12) United States Patent
Gormley

(10) Patent No.: US 7,590,768 B2
(45) Date of Patent: Sep. 15, 2009

(54) CONTROL AND INTERCONNECTION SYSTEM

(76) Inventor: Joseph Gormley, 16839 Golfview Dr., Livonia, MI (US) 48154

( * ) Notice: Subject to any disclaimer, the term of this patent is extended or adjusted under 35 U.S.C. 154(b) by 539 days.

(21) Appl. No.: 11/234,410

(22) Filed: Sep. 23, 2005

(65) Prior Publication Data

US 2007/0073908 A1   Mar. 29, 2007

(51) Int. Cl.
  *G06F 3/00* (2006.01)
  *G06F 13/00* (2006.01)
(52) U.S. Cl. .................................. 710/8; 710/5; 710/15
(58) Field of Classification Search .................. None
  See application file for complete search history.

(56) References Cited

U.S. PATENT DOCUMENTS

| | | | |
|---|---|---|---|
| 4,908,792 | A | 3/1990 | Przybyla et al. |
| 5,477,827 | A | 12/1995 | Weisman, II et al. |
| 5,513,107 | A | 4/1996 | Gormley |
| 5,530,360 | A | 6/1996 | Kerchaert et al. |
| 5,680,328 | A | 10/1997 | Skorupski et al. |
| 5,794,164 | A | 8/1998 | Beckert et al. |
| 5,850,209 | A | 12/1998 | Lemke et al. |
| 5,857,158 | A | 1/1999 | Zimmermann et al. |
| 5,884,202 | A | 3/1999 | Arjomand |
| 5,890,086 | A | 3/1999 | Wellman et al. |
| 5,892,942 | A | 4/1999 | Ohnishi et al. |
| 5,916,287 | A | 6/1999 | Arjomand et al. |
| 6,009,363 | A | 12/1999 | Beckert et al. |
| 6,052,634 | A | 4/2000 | Pathe et al. |
| 6,150,925 | A | 11/2000 | Casazza |
| 6,175,789 | B1 | 1/2001 | Beckert et al. |
| 6,185,491 | B1 | 2/2001 | Gray et al. |
| 6,198,996 | B1 | 3/2001 | Berstis |
| 6,202,008 | B1 | 3/2001 | Beckert et al. |

(Continued)

FOREIGN PATENT DOCUMENTS

| EP | 0801351 A2 | 10/1997 |
|---|---|---|
| EP | 1186477 A3 | 3/2004 |

OTHER PUBLICATIONS

Karen Parnell, Automotive Reconfigurable Platforms—Creating the Dream, ECN Magazine, Jul. 1, 2004, www.reed-electronics.com/ecnmag.

(Continued)

*Primary Examiner*—Ilwoo Park
*Assistant Examiner*—Scott Sun
(74) *Attorney, Agent, or Firm*—Stevens & Showalter LLP

(57) ABSTRACT

A control and interconnection system for integrating a plurality of peripherals into a computer system comprises a system core for processing data, an input module adapted to couple signals from associated peripherals to the system core and an output module adapted to direct signals from the system core to corresponding peripherals. The system core includes a reconfigurable space having hardware for supporting reconfigurable hardware programming and memory for supporting reconfigurable software programming to offload at least a portion of peripheral processing requirements to the system core. The system core further provides a supervising processor that is configured to provide control information to identified peripherals as necessary to implement a customized overall configuration. The supervising processor further controls the allocation and configuration of the reconfigurable space into a plurality of independent information processing workspaces, where each information processing workspace supports hardware, software or both hardware and software.

12 Claims, 11 Drawing Sheets

U.S. PATENT DOCUMENTS

| | | | |
|---|---|---|---|
| 6,240,347 | B1 | 5/2001 | Everhart et al. |
| 6,253,122 | B1 | 6/2001 | Razavi et al. |
| 6,270,350 | B1 | 8/2001 | Christopher |
| 6,362,730 | B2 | 3/2002 | Razavi et al. |
| 6,370,449 | B1 | 4/2002 | Razavi et al. |
| 6,407,554 | B1 | 6/2002 | Godau et al. |
| 6,438,737 | B1 | 8/2002 | Marelli et al. |
| 6,654,669 | B2 | 11/2003 | Eisenmann et al. |
| 6,728,603 | B2 | 4/2004 | Pruzan et al. |
| 6,757,600 | B2 | 6/2004 | Bächle |
| 6,831,375 | B1 | 12/2004 | Currie et al. |
| 2001/0001319 | A1* | 5/2001 | Beckert et al. ............ 701/36 |
| 2001/0012976 | A1 | 8/2001 | Menig et al. |
| 2002/0004694 | A1 | 1/2002 | Mcleod et al. |
| 2002/0111715 | A1* | 8/2002 | Richard ................ 701/1 |
| 2002/0125998 | A1 | 9/2002 | Petite et al. |
| 2003/0163298 | A1 | 8/2003 | Odom et al. |
| 2004/0148069 | A1 | 7/2004 | Marshall et al. |
| 2004/0170070 | A1 | 9/2004 | Rapp et al. |
| 2004/0225415 | A1 | 11/2004 | Newberry |
| 2004/0230358 | A1 | 11/2004 | Stam et al. |
| 2005/0004726 | A1 | 1/2005 | Paquet |
| 2005/0065684 | A1 | 3/2005 | Larson et al. |

OTHER PUBLICATIONS

A. Winter, D. Bittruf, Y. Tanurhan, K.D. Muller-Glaser, Abstract of Rapid Prototyping of a Communication Controller for the CAN bus, 7th IEEE International Workshop on Rapid System Prototyping (RSP '96), Thessaloniki, Greece, IEEE, Inc., Jun. 19, 1996.

Karen Parnell, Put the Right Bus in Your Car, The Amazing Array of features Available in Today's Cars Has Spawned New in-Vehicle Bus, AMI Semiconductor, Xcell Journal Online, Xilinx, Inc., Winter 2004.

M. Weerwein, et al., Embedded Systems Verification with FGPA-Enhanced In-Circuit Emulator, de.bosch.com.

Automotive Open System Architecture Development Partnership Information Pack, AUTOSAR, Jan. 21, 2003.

Semiconductor Solutions for the European Automotive Industry, Automotive Specifics, AMI Semiconductor, Issue 1, pp. 1-8, 2003.

Robert Green, Karen Parnell, FPGAs Are the Brains Behind "Smart" Cars, Xcell Journal, Summer 2003.

Karen Parnell, Telematics Drives the New Automotive Business Model, Xcell Journal, Fall 2002.

Karen Parnell, You Can Take it with You: On the Road with Xilinx, Xcell Journal, Summer 2002.

Programmable Solutions for Automotive Applications, Xilinx, 2004, USA.

Karen Parnell, Reconfigurable Vehicles Are Just Around the Corner, Xcell Journal, Fall/Winter 2001.

Xilinx Solutions for Automotive, pp. 1-94, Xilinx.

RapidChip Platform ASICs vs FPGAs, Get lower cost, higher design efficiency, and faster time to revenue, LSI Logic Corporation Mar. 2005.

Karen Parnell, Could Microprocessor Obsolescence Be History? , Xcell Journal, Spring 2003.

Xilinx Automotive (XA) Programmable Logic Solutions 2005.

* cited by examiner

CONTROL AND INTERCONNECTION SYSTEM

CROSS REFERENCE TO RELATED APPLICATIONS

The present application is related to U.S. patent application Ser. No. 11/234,753, entitled "SYSTEMS AND METHODS FOR IMPLEMENTING A VEHICLE CONTROL AND INTERCONNECTION SYSTEM", which is filed currently herewith and hereby incorporated by reference herein.

BACKGROUND OF THE INVENTION

The present invention relates in general to computer systems and in particular to control and interconnection systems that allocate reconfigurable hardware space among multiple, diverse peripherals for peripheral specific hardware processing.

An increasing number of vehicles are being equipped with one or more independent computer and electronic processing systems. Certain of the processing systems are provided for vehicle operation or efficiency. For instance, many vehicles are now equipped with computer systems for controlling engine parameters, brake systems, tire pressure and other vehicle operating characteristics. A diagnostic system may also be provided that collects and stores information regarding the performance of the vehicle's engine, transmission, fuel system and other components. The diagnostic system is typically coupled to an external computer to download or monitor the diagnostic information to aid a mechanic during servicing of the vehicle.

Still further, other processing systems may be provided for operator comfort and/or convenience. For example, vehicles are now available that include navigation and global positioning systems and services which provide travel directions and emergency roadside assistance. Vehicles are also provided with multimedia entertainment systems that include sound systems, e.g., satellite radio, broadcast radio, compact disk and mp3 players and video players. Still further, vehicles may include cabin climate control, electronic seat and mirror repositioning and other operator comfort features.

However, each of the above processing systems is independent, non-integrated and incompatible. That is, such processing systems provide their own sensors, input and output devices, power supply connections and processing logic. Moreover, such processing systems may include sophisticated and expensive processing components such as application specific integrated circuit (ASIC) chips or other proprietary hardware and/or software logic that is incompatible with other processing systems in the vehicle.

SUMMARY OF THE INVENTION

A control and interconnection system for integrating a plurality of vehicle peripherals into a computer system comprises a system core, an input module and an output module. The system core comprises a reconfigurable processing environment that includes one or more reconfigurable hardware devices, such as field programmable gate arrays, memory and processing logic, such as one or more processors.

According to one aspect of the present invention, a control and interconnection system for integrating a plurality of peripherals into a computer system comprises a system core for processing data, an input module adapted to couple signals from associated peripherals to the system core and an output module adapted to direct signals from the system core to corresponding peripherals. The system core comprises a reconfigurable space for offloading at least some peripheral processing requirements to the system core, where the reconfigurable space includes hardware for supporting reconfigurable hardware programming and memory for supporting reconfigurable software programming of peripheral or application specific functionalities.

Further, a supervising processor is operatively configured to provide control information to at least one peripheral associated with the control and interconnection system to coordinate performance characteristics of various peripherals based upon at least one determined operating condition. The supervising processor also controls the allocation of the reconfigurable space into a plurality of independent information processing workspaces, where each information processing workspace is defined by at least one of an allocated portion of the hardware for supporting reconfigurable hardware programming and an allocated portion of the memory for supporting reconfigurable software programming. In this regard, the supervising processor further controls the configuration of each allocated information processing workspace based upon programming instructions derived to implement peripheral defined functionalities.

A general purpose processor is provided for interaction with the memory of the reconfigurable space and for executing functions of the system core. Also, a peripheral controller is arranged to direct the flow of information in the control and interconnection system by communicating data between the input module, the output module, the reconfigurable space and the general purpose processor. Still further, a security processor may be configured such that access between the peripheral controller and each information processing workspace of the reconfigurable space is only granted to authorized peripherals.

A method of integrating a plurality of peripherals into a control and interconnection system having a reconfigurable processing environment according to an aspect of the present invention comprises providing a system core for processing data having a reconfigurable processing environment, providing an input module adapted to couple signals from associated external peripherals to the system core and an output module adapted to direct signals from the system core to corresponding external peripherals. The system receives a request to allocate an information processing workspace from the reconfigurable processing environment to implement peripheral specific processing of a first peripheral. The system further receives associated with the first peripheral, programming instructions to configure the allocated information processing workspace with at least one of hardware and software configuration information. The system then allocates an unused portion of the reconfigurable processing environment for use by the first peripheral sufficient to implement the programming instructions if the programming instructions are properly authorized, and configures the allocated information processing workspace based upon the programming instructions to perform at least one of function specific or peripheral specific applications. Once configured, the system allows access to the allocated information processing workspace only to authorized peripherals.

According to a further aspect of the present invention, a control and interconnection system for integrating a plurality of peripherals into a computer system having a reconfigurable processing environment comprises a system core, for processing data, an input module adapted to couple signals from associated peripherals to the system core and an output module adapted to direct signals from the system core to corresponding peripherals. The system core may comprise a reconfigurable space, a supervising processor, a mission configuration control, a mode control monitor, a general purpose processor, and/or a peripheral controller.

The reconfigurable space is provided for offloading at least a portion of peripheral processing requirements to the system core and includes hardware for supporting reconfigurable hardware programming and memory for supporting reconfigurable software programming of peripheral-specific or application-specific functionalities that are not related to system core processes. The supervising processor may be configured to control the allocation and configuration of the reconfigurable space into a plurality of independent information processing workspaces, where each information processing workspace is defined by at least one of an allocated portion of the hardware for supporting reconfigurable hardware programming and an allocated portion of the memory for supporting reconfigurable software programming based upon programming instructions that implement peripheral defined functionalities.

The mission configuration control may be operatively configured to provide control information to at least one peripheral associated with the control and interconnection system to coordinate performance characteristics of multiple peripherals. Correspondingly, the mode control monitor may be operatively configured to dynamically modify the control information based upon at least one determined operating condition. The general purpose processor may be provided for interaction with the memory of the reconfigurable space and for executing functions of the system core and the peripheral controller may be arranged to direct the flow of information in the control and interconnection system by communicating data between the input module, the output module, and at least one of the reconfigurable space and the general purpose processor, wherein select input signals at the input module are associated with their associated information processing workspace in the reconfigurable space of the system core.

BRIEF DESCRIPTION OF THE DRAWINGS

The following description of the preferred embodiments of the present invention can be best understood when read in conjunction with the following drawings, where like structure is indicated with like reference numerals, and in which.

DETAILED DESCRIPTION

In the following description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
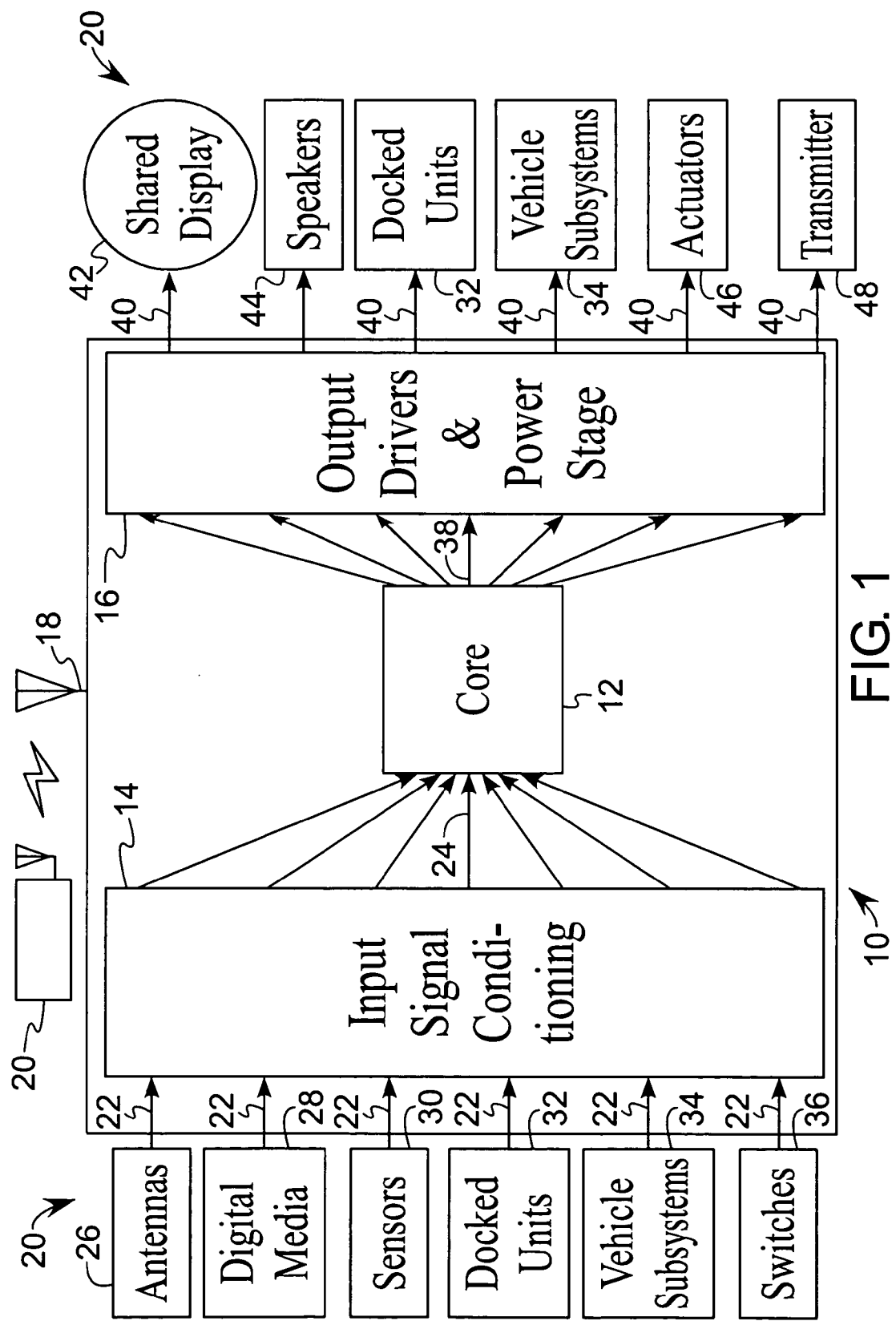
FIG. 1 is a system block diagram of a control and interconnection system according to an aspect of the present invention.

Referring now to the drawings, and particularly to FIG. 1, a control and interconnection system 10 is presented in an exemplary application for use with a vehicle. The control and interconnection system 10 includes generally, a system core 12, an input module 14, an output module 16 and an optional transceiver 18. The control and interconnection system 10 supports one or more peripherals 20 that communicate with the system core 12, e.g., via the input module 14, the output module 14 and/or the transceiver 18.

The system core 12 comprises a reconfigurable processing environment capable of allocating hardware and software space among multiple, diverse peripherals 20 for application and/or peripheral specific processing. The system core 12 further includes a combination of hardware and software for performing supervisory functions that oversee the operations of the associated peripherals 20 and for performing various system and administrative functions including support for the reconfigurable processing environment as will be set out in greater detail herein.

The input module 14 functions as an interface that allows the output(s) of multiple associated peripherals 20 to communicate with the system core 12. The output module 16 functions as an interface that allows the system core 12 to communicate with the inputs to various peripherals 20, which may be the same as, or different from the peripherals 20 coupled to the input module 14. The system core 12 may also optionally selectively communicate with a transceiver 18 for wired or wireless communication between peripherals 20, which may comprise in-vehicle peripherals, extravehicular peripherals, external communications systems and/or external processing environments. Thus, fixed location peripherals 20 may further be integrated with the system 10. In this regard, the transceiver 18 may conceptually function as extensions of both the input and output modules 14, 16 to ensure that data is suitably manipulated and routed within the control and interconnection system 10. Any suitable communications protocol can be utilized depending upon the particular application, a few examples of which include 802.11, 802.16, Bluetooth, short message service (SMS), global positioning system (GPS), wireless local area network (WLAN), code division multiple access (CDMA), AM, FM, Universal Mobile Telecommunications System (UMTS), cellular phone technology such as Global System for Mobile Communications (GSM), etc. In practice, the input module 14 and the output module 16 may be integrated, e.g., where an application requires or can benefit from bi-directional communication over a common pathway.

As used herein, the term "peripheral" should be interpreted broadly to include devices or other structures that include any combination of hardware and software, and that are capable of interacting with the control and interconnection system 10. Thus, peripherals 20 may be implemented as software and/or hardware that is executed entirely within the system core 12, as software and/or hardware that is executed within the system core 12 in combination with one or more external devices, e.g., a dedicated, peripheral specific component, a common or shared component such as a display, common input/output features, etc., or as software and/or hardware that is executed in an external device in communication with the control and interconnection system 10. The peripherals 20 may provide the system 10 with additional capabilities including features, functionalities, services, etc. Moreover, the peripherals 20 may perform independent functions or form part of one or more collective processes. Further, the peripherals 20 may provide general or specific capabilities to one or more applications and may be selectively active or inactive depending upon specific events, such as based upon operator interaction, environmental conditions, the activities of other related or non-related peripherals 20, or other reasonable factors.

The peripherals 20 that are coupled to the input module 14 may have varying output characteristics, thus the input module 14 includes a plurality of inputs 22 and one or more core interface input paths 24 to effect communication of data from the various peripherals 20 to the system core 12. The input module 14 may condition, buffer, scale, encode, transform and/or perform other tasks necessary to convert the signals appearing at its inputs 22 into appropriate information signals suitable for processing or other manipulation by the system core 12. A few exemplary peripherals 20 that may couple to the input module 14 include one or more antennas 26, digital media 28, which includes digital devices, systems, processors or other digital logic that outputs digital data, one or more sensors 30 that output analog or digital data, docked units 32, which may include third party and system specific hardware that is selectively coupled to the input module 14, e.g., via a suitable cradle, docking station or connection port, vehicle subsystems 34 that provide subsystem specific vehicle operational control/monitoring and switches 36, which may include electronic switches, tactile switches, relays, and other devices for differentiating between two or more states. Other exemplary peripherals that may be interfaced with the input module 14 include measurement devices, potentiometers, optical devices, encoders, thermal devices, stress and strain gauges and other devices for generating analog or digital signals.

The illustrated input module 14 is capable of converting various digital and/or analog signals to a format suitable for processing by the system core 12. As such, the input module 14 may accommodate, for example, single or dual polarity analog signals over a voltage range suitable for the particular application, e.g., +/−5 volts up to +/−20 volts, or single supply voltages up to 48 volts. Further, the input module 14 may accommodate peripherals 20 such as variable reluctance sensors that are capable of generating voltages in excess of 100 Volts by attenuating the corresponding signals to a range of levels suitable for processing by the system core 12. Moreover, the input module 14 may perform analog to digital conversion at appropriate bit resolutions and sampling rates to convert incoming analog information to digital data.

The peripherals 20 that are coupled to the output module 16 will generally tend to have varying data input characteristics, thus the output module 16 includes one or more core interface output paths 38 and a plurality of outputs 40, each output 40 coupled to one or more external peripherals 20 to effect communication of data from the system core 12 to the peripherals 20. The output module 16 includes appropriate output driver(s) and power stages as the application requires. For example, the output module 16 may condition, buffer, scale, encode, transform and/or perform other tasks necessary to convert output signals from the system core 12 to suitable signals for processing by the corresponding external peripherals 20.

Exemplary peripherals 20 that may couple to the output module 16 include one or more displays 42 that may be either dedicated to a specific peripheral 20 or shared among multiple peripherals and functions of the system core 12, speakers 44, docked units 32, vehicle subsystems 34, actuators, solenoids, heaters and motors 46, e.g., for power door locks, windows, wiper washers, mirrors, power/heated seats etc., transmitters 48 and other suitable devices. The output module 16 may provide data output from the system core 12 in analog and/or digital form and may provide isolated outputs, e.g., using switched relays, optical isolation or other isolating techniques. Moreover, the control and interconnection system 10 may generate outputs that are used as network messages, control signals including pulse width modulated outputs, pulse generator outputs, counter outputs, timers, H-bridge or other suitable motor control outputs, etc.

Moreover, control and/or data communication links can be established between the control and interconnection system 10 various peripherals 20 such as and lighting, climate control, powered window, locks and mirrors and other vehicle convenience features. Still further, control and/or data communication links can be established between the control and interconnection system 10 and displays, telematics, audio, video and other entertainment/communication features.

Figure 2:
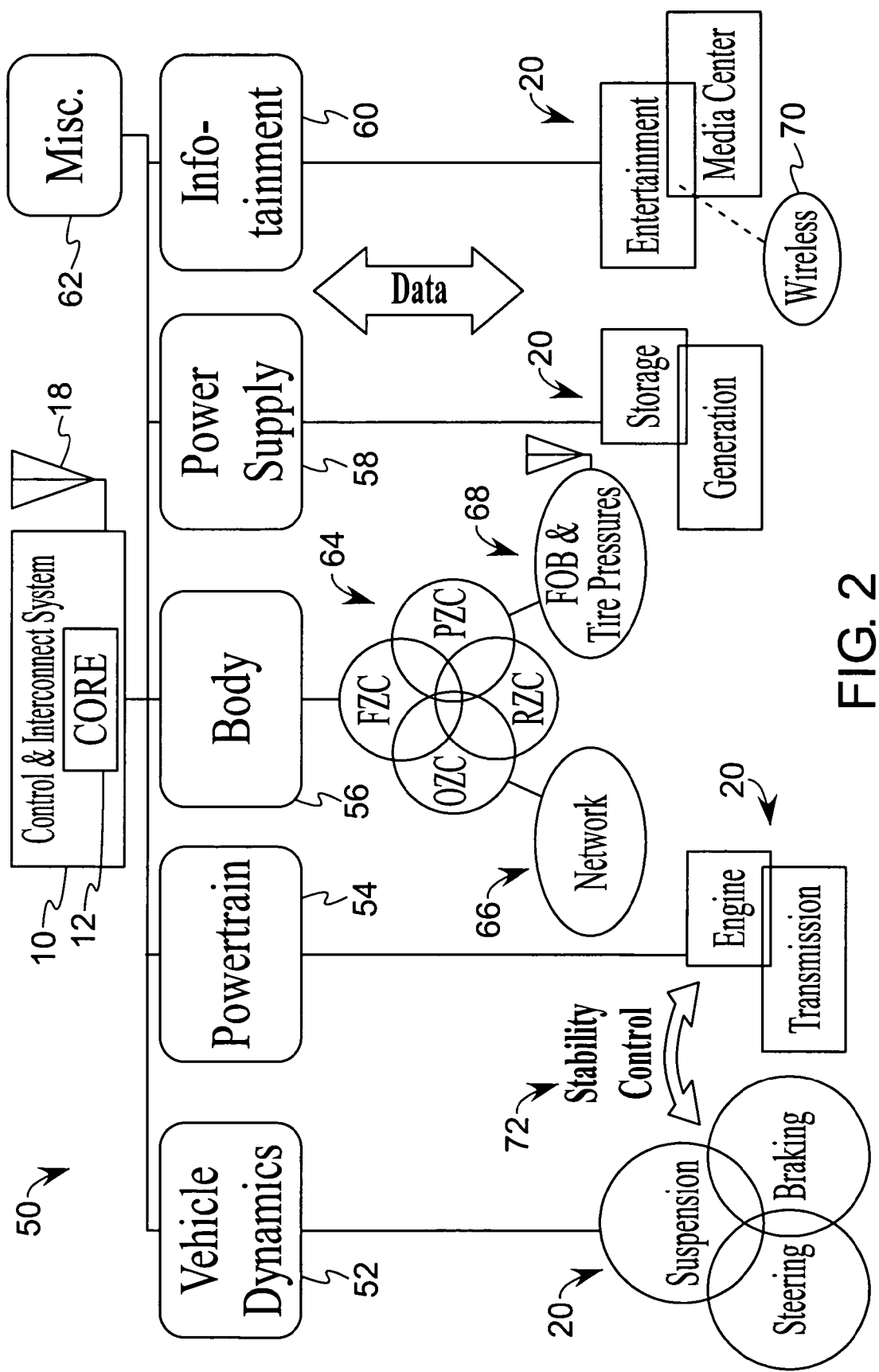
FIG. 2 is an exemplary system topology diagram of the control and interconnection system of FIG. 1 showing a first exemplary conceptual organization of peripherals connected thereto.

Referring to FIG. 2, a topological diagram 50 illustrates one exemplary organization of external peripherals 20 that may be integrated with the control and interconnection system 10. For purposes of discussion herein, the peripherals 20 are organized into relatively broad, general classes that conceptually form main or zonal branches of like or related external peripherals 20. The exemplary classes include a vehicle dynamics class 52, a powertrain class 54, a vehicle body class 56, a power supply class 58, an information and/or entertainment class 60, also referred to herein as an infotainment class, and a miscellaneous class 62. Additional or different conceptual classes may alternatively be considered depending upon the needs of the particular implementation of the control and interconnection system 10.

The vehicle dynamics class 52 includes for example, peripherals 20 that monitor, control or adjust the vehicle suspension, braking, steering and/or other operational systems. The powertrain class 54 includes for example, peripherals 20 that monitor, control or adjust the vehicle engine and transmission. The body class 56 includes for example, peripherals 20 that monitor or control the vehicle body interior or exterior or components attached to the body such as body impact sensors, tire pressure sensors, mirror controls, seat and environment controls etc., or devices, features or equipment that provide comfort to the vehicle operator or passengers. As illustrated, the body class 56 is conceptually organized into four main zone controls 64 that overlap including a front zone control (FZC), a rear zone control (RZC), an operator zone control (OZC) and a passenger zone control (PZC). Other arrangements and logical organizations may alternatively be implemented. The various peripherals 20 of the body class 56 are illustrated as communicating between themselves and with the control and interconnection system 10 over a bus system 66. Various bus configurations will be discussed in greater detail below. Further, a peripheral 20 such as a key fob, e.g., for unlocking the vehicle doors, may communicate over a short-range wireless interface 68 with the control and interconnection system 10, e.g. via the transceiver 18. A tire sensor or other device may also communicate wirelessly with the control and interconnection system 10, e.g., over the short-range wireless interface 68.

The power supply class 58 includes peripherals 20 that filter, regulate, generate, distribute and store vehicle power. One aspect of the control and interconnection system 10 is the ability to distribute power via a suitable wiring harness or other interconnection system to peripherals 20 that are connected to the system thus eliminating the need for redundant power supplies as will be discussed in greater detail below. The power supply class 58 may also interact with various peripherals 20 related to the powertrain via the control and interconnection system 10. For example, in hybrid electric vehicles, interaction of peripherals 20 of the power supply class 58 may interact with peripherals 20 of the powertrain class 54 to address terrain, energy, torque and other vehicle performance parameters.

The infotainment class 60 integrates entertainment, and quality enhancing electronic products, features and services into the control and interconnection system 10, e.g., to provide information to a vehicle operator or passenger for purposes of entertainment, instruction and/or convenience. For example, the infotainment class 60 can include peripherals 20 such as audio and video delivery devices, cellular technology devices, global positioning technologies and Internet devices that can operate for example, over a wireless connection 70. The miscellaneous class 62 may comprise other devices, services or features, examples of which may include power take off (PTO) devices, and other ancillary equipment.

According to at least one aspect of the present invention, the control and interconnection system 10 provides supervisory control functionality, e.g., via a supervisory processor. As used herein, the term "supervisory control" may relate to at least two different characterizations. In a first characterization, the control and interconnection system 10 includes supervisory functionality that oversees control functions performed by one or more peripherals 20, e.g., where such control is necessary or otherwise improves integration of the system.

For example, during operation of a vehicle, the supervisory control, e.g., a supervising processor 106 (described in greater detail with reference to FIG. 5), may provide control information to identified peripherals 20 as necessary to implement a customized overall configuration. By allowing the control and interconnection system 10 to provide supervisory control, a corresponding peripheral 20 or group of peripherals 20 can respond to control commands from the control and interconnection system 10 in a coordinated manner. In this regard, the control and interconnection system 10 need not replace the processing typically performed by external controllers. Rather, the control and interconnection system 10 oversees the controllers, e.g., by programming them with high level (supervisory level) command information, such as by modifying parameters, set points, operating modes or by providing other peripheral control commands related to vehicle performance.

Moreover, the control and interconnection system 10 may respond to feedback from the peripherals 20 that are being supervised, or feedback may be considered from non-related peripherals 20 including those associated peripherals not directly coupled to the vehicle, such as by remote or fixed peripherals, e.g., to ensure that the various peripherals 20 of the vehicle are properly operating, executing or performing as desired for a given set of conditions. The supervising processor 106 may further be configured to oversee operating characteristics of each hierarchical grouping of classes 52, 54, 56, 58, 60, 62 based upon one or more determined operating conditions such that an overall vehicle configuration is customized. The interaction of the supervising processor 106 and operating conditions will be described in greater detail below.

Thus, in one characterization of the control and interconnection system 10, a supervisory processor provides control information to at least one peripheral 20 associated with the control and interconnection system 10 to coordinate performance characteristics of related and/or unrelated identified external peripherals based upon at least one determined operating condition. As one example, if the control and interconnection system 10 determines as an operating condition that a vehicle is off road, e.g., as determined by peripherals 20 such as tire sensors, a GPS system or other suitable input device, a peripheral 20 that comprises a powertrain controller and a peripheral 20 that comprises a vehicle dynamics controller may both be set by the supervisory processor of the control and interconnection system 10 to the optimal or best control points for the given operating environment. Thus, controllers external to the control and interconnection system 10, e.g., suspension, steering, braking, transmission, engine performance, and/or other performance features of the various peripherals 20 may be set to operate under optimal or preferred conditions in an integrated manner resulting in a truer intelligent integrated vehicle realization.

Moreover, non-OEM types of peripherals, e.g., third party or post-manufacture add on peripherals 20 can also be optimized to the given operating conditions in a equally suitable manner. For example, when the vehicle is determined to be off road, the control and interconnection system 10 may also turn on fog lights, animal warning devices such as deer whistles, etc. The control and interconnection system may also adjust the infotainment class peripherals to pre-configured parameters such as a desired radio station, set a citizens band radio (CB) to a particular channel, or broadcast a message, e.g., to a determined location to alert an external source that the vehicle has gone off road, e.g., for tracking, monitoring or other informational purposes.

Comparatively, certain peripherals 20 may not require and/or benefit from supervisory control, such as autonomous devices that only provide outputs, e.g., encoders, potentiometers, etc. However, such peripherals 20 may be utilized by the control and interconnection system 10 to make decisions affecting the supervisory control decisions over other related or non-related controllable peripherals 20, e.g., by determining that the vehicle is actually off road in the above example.

Further, the various peripherals 20 may also communicate among themselves with or without intervention from the control and interconnection system 10. For example, as illustrated, stability and control data may be communicated between the peripherals 20 of the vehicle dynamics class 52 and the powertrain class 54 as indicated by the arrow 72. Moreover, the network 66 allows various peripherals to communicate among themselves, either dependently or independently of interaction with the control and interconnection system 10. In this regard, a supervisory processor of the control and interconnection system 10 may oversee the controllers in the communicating peripherals 20 to verify that are each performing their assigned or intended tasks.

A second characterization of supervisory control relates to overseeing and/or controlling the actions of the various processes and functions performed by components of the control and interconnection system 10, e.g., by supervising system actions relating to the reconfigurable processing environment of the system core 12, or by supervising actions of the input module 14 or output module 16. This aspect of supervisory control will be discussed in greater detail below.

Moreover, a supervisory processor may function in the capacity either the first or second characterizations, or of both of the above-described characterizations. For example, the control and integration system 10 can oversee various peripherals 20 and trigger control events of one peripheral 20 in response to actions of another peripheral 20. As one illustrative example, the control and interconnection system 10 may issue commands to an appropriate vehicle component controller to adjust steering and/or suspension parameters based upon inputs from other peripherals 20, e.g., detected tire pressure level or detected environmental conditions such as rain, etc. Further the control and interconnection system 10 may issue commands to an appropriate vehicle component controller to adjust steering and/or suspension parameters based upon vehicle operator preference data and or processing logic programmed into the reconfigurable processing environment of the control and interconnection system 10. For example, vehicle handling and preference data may be stored in a memory device. Alternatively, a particular vehicle operator may prefer certain vehicle performance parameters only under certain conditions as determined by vehicle peripherals 20, such as when towing a load or driving for road handling performance compared to fuel economy, etc.

Figure 3:
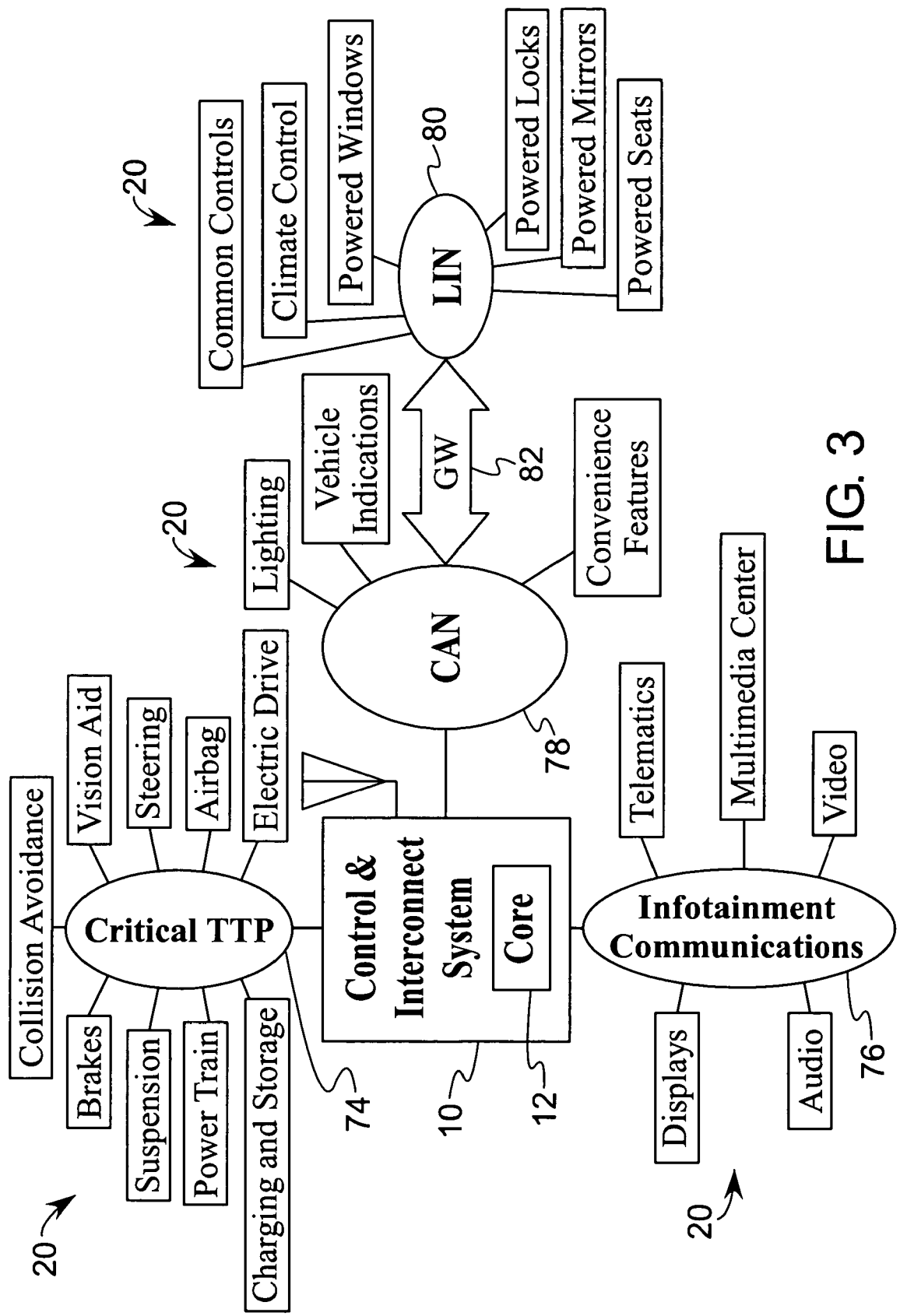
FIG. 3 is an exemplary communications topology diagram of the control and interconnection system of FIG. 1 showing a second exemplary conceptual organization of peripherals connected thereto, based upon a variety of exemplary communications paths.

In addition to coupling directly to various peripherals 20, e.g., via the input and output modules 14, 16, the control and interconnection system 10 may communicate over one or more buses. Referring to FIG. 3, the control and interconnection system 10 further allows hierarchical prioritizing of processing capability so that there is sufficient bandwidth to support peripherals 20 with time sensitive or system critical needs by accommodating several independent parallel communications subsystems. As illustrated, the control and interconnection system 10 couples to a first, system critical bus 74, a second, multimedia bus 76, a vehicle controller area network (CAN) bus 78 and a vehicle Local Interconnect Network (LIN) bus 80. The particular implementation of the control and interconnection system 10 will likely determine which bus protocols are required and/or desired for a particular implementation, thus the above is merely exemplary of the bus configurations that may be implemented with the system core 12. Additionally, the scalable and reconfigurable nature of the control and interconnection system 10 allows flexibility in periodically upgrading, updating, adding to and removing from the available buses as the specific application dictates, as will be seen in greater detail herein.

The system critical bus 74 may be used to communicate time or operation sensitive data to the system core 12. For example, the system critical bus 74 may be implemented as a time-triggered data-bus protocol (TTP), which may be used to communicate data from diverse peripherals 20 such as collision avoidance systems, brake systems, suspension systems, charging and storage systems, powertrain systems, vision aid systems, steering systems, airbag systems, electric drive systems and other data and/or control sensitive systems, devices, and sensors.

The multimedia bus 76 may be used to communicate data between infotainment peripherals 20 and the system core 12. The multimedia bus 76 may be implemented using any appropriate communications bus. For example, the multimedia bus 76 may support wired devices that communicate over the universal serial bus (USB), Firewire (IEEE1394), MOST optical network or other standard or proprietary format. Additionally, the system core 12 may communicate with one or more peripheral 20 using wireless technology, examples of which include BlueTooth, 802.11, CDMA, AM, FM, WIFI, etc.

The CAN bus 78 can be used to form a communications network between and among peripherals 20 such as control lighting devices, vehicle indications and displays, convenience features and other typical CAN bus devices and sensors. The LIN bus 80 may be used to form a communications network with peripherals 20 such as common controls, climate control, powered windows, powered locks, powered mirrors, powered seats, etc. The peripherals 20 on the LIN bus 80 may communicate among themselves, or with the system core 12. Moreover, data can pass from the LIN bus 80 to the control and interconnection system 10 either directly, or via an intervening bus, such as the CAN bus using a suitable bus gateway 82.

The Midplane Controller

Figure 4:
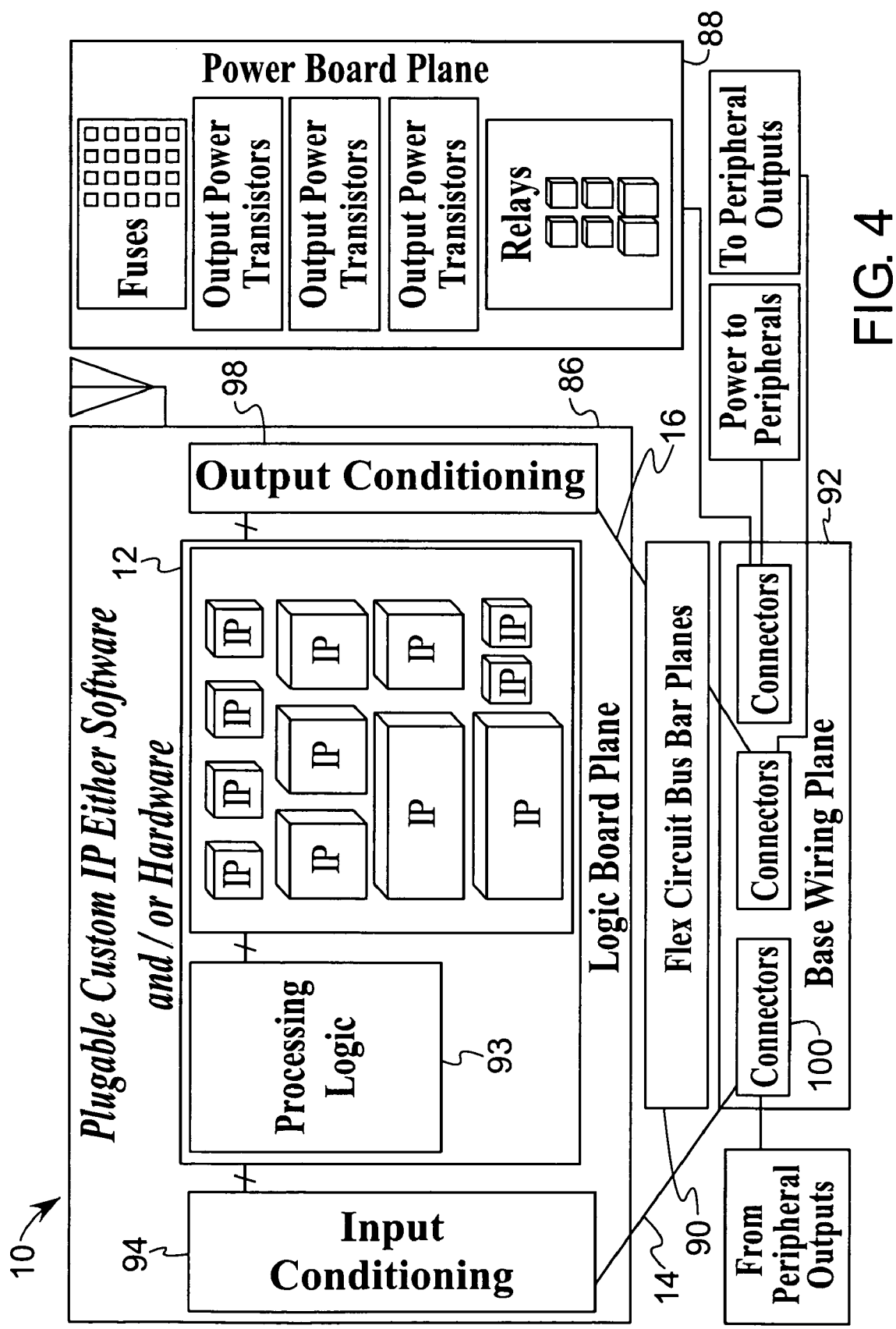
FIG. 4 is a block diagram illustrating several exemplary planes of the control and interconnection system of FIG. 1.

Referring to FIG. 4, the control and interconnection system 10 can be organized into several planes that each defines a common primary objective, conceptually defining a midplane controller. As the exemplary arrangement illustrates, the control and interconnection system 10 includes a logic board plane 86, a power board plane 88, one or more flex circuit bus bar planes 90 and a base wiring plane 92.

The logic board plane 86 includes the system core 12, which comprises processing and support circuitry 93 of the control and interconnection system 10 as explained in greater detail herein. The input and output modules 14, 16 may be contained on the logic board plane 86, or the input and output modules 14, 16 may be distributed across several planes 86, 88, 90 and 92. For example, as illustrated, the input module 14 includes input conditioning circuitry 94 on the logic board plane 86, bus connections across the flexible bus bar plane 90 and connectors and other coupling arrangements 100 on the base wiring plane 92. Similarly, the output module 16 includes output conditioning circuitry 98 on the logic board plane 86, bus connections across the flexible bus bar plane 90 and connectors and other coupling arrangements 100 on the base wiring plane 92.

The power board plane 88 may include for example, several types of housing components such as power distribution centers (PDC), junction boxes, fuse boxes, etc., that interconnect the major harnesses of the system. Additionally, an array of fuses, output drivers such as transistors, relays, and other suitable power limiting and isolating devices may be provided. The power board plane 88 provides a common power supply that may be used to power the control and interconnection system 10 as well as the various connected peripherals 20. As such, the power board plane 88 serves as an electrical distribution system.

The power board plane 88 is preferably capable of providing sufficient drive current to power outputs at their various required voltages so as to accommodate the power requirements of anticipated peripherals 20. The power board plane 88 eliminates or reduces power supply redundancy across the various peripherals 20 connected to the control and interconnection system 10 as each peripheral 20 is no longer required to supply its own power supply conditioning, thus saving each peripheral provider the cost of their specific power supply circuitry. Additionally, the elimination of power supply circuitry allows the peripherals 20 to be provided in smaller footprints with reduced overall weight. Moreover, greater reliability of the various peripherals 20 may be realized by reducing the number of vehicle-level interconnections, which may be vulnerable to malfunction and/or failure.

The flex circuit bus bar planes 90 are provided to bus signals including information and power signals between the base wiring plane 92, the logic board plane 86 and the power board plane 88. The base wiring plane 92 provides wiring harnesses, connectors, plugs, conversion adapters and other necessary routing, coupling and other interconnection devices. For example, reconfigurable devices can be provided so as to implement computer generated and reprogrammable wiring schemes. The base wiring plane 92 may thus be utilized to provide an interface for coupling the various peripherals 20 to the system core 12. Signals may be coupled through the base wiring plane to the logic board plane 86 and/or the power board plane 88 by the flex circuit bus bar plane 90. As such, the interconnection between the various peripherals 20 and the control and interconnection system 10 can be performed at a common source at the base wiring plane 92. For example, application specific insulation displacement connectors (IDC) or other suitable connector devices can be used to couple wiring from peripherals 20 to the system core 12 of the control and interconnection system 10 using computer determined interconnections, e.g., via the flex circuit bus bar plane 90 to provide flexible, yet reliable interfacing opportunities for the various peripherals 20. The base wiring plane 92 may further take advantage of integration efficiencies to minimize the wiring required to interface with associated peripherals 20. For example, power and data supplied to a particular peripheral 20 may be distributed across two wires or other suitable arrangement.

The System Core 12

Figure 5:
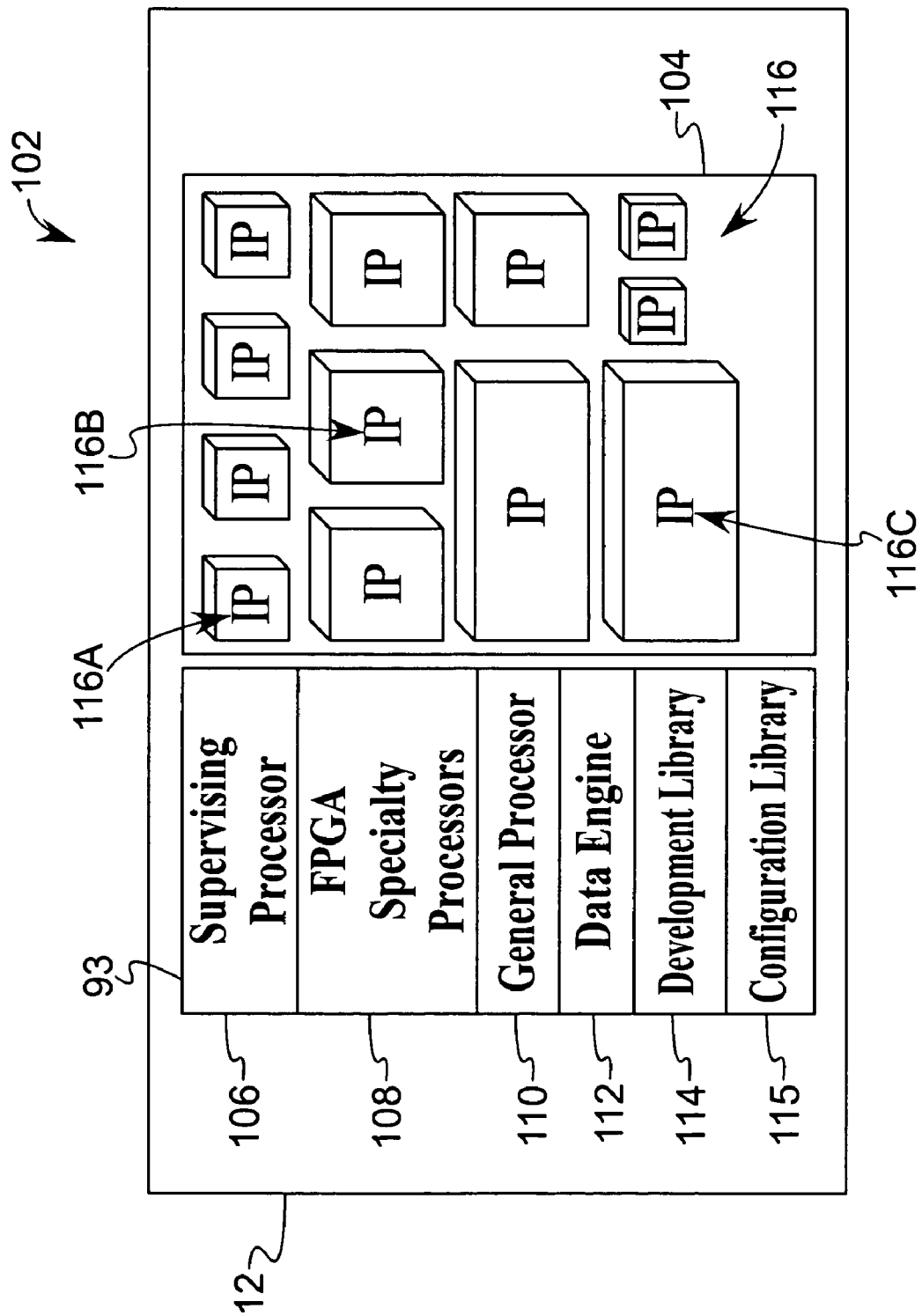
FIG. 5 is a block diagram of a processing subsystem of the control and interconnection system of FIG. 1.

Referring to FIG. 5, the system core 12 comprises a reconfigurable processing environment 102 that supports reconfigurable hardware and software. As illustrated, the reconfigurable processing environment 102 includes a reconfigurable space 104 that defines a work area that may be utilized by peripherals 20 and the appropriate processing and support circuitry 93. That is, the reconfigurable space 104 may be utilized for offloading at least some peripheral processing requirements to the system core 12, where the reconfigurable space 104 includes hardware for supporting reconfigurable hardware programming and memory for supporting reconfigurable software programming of peripheral or application specific functionalities that are not related to system core processes as will be described in greater detail below.

The processing and support circuitry 93 may include a supervising processor 106, one or more specialty processors 108, one or more general purpose processors 110, a data engine 112, one or more development libraries 114 and one or more configuration libraries 115. The processing and support circuitry 93 may further include additional features, e.g., bus and other interfaces to support data flow and communications as seen with reference to FIG. 3, data processing and system operation as will be described in greater detail with reference to FIGS. 6-8.

Depending upon the particular implementation, fewer, additional or alternate arrangements of processing logic and other control circuitry 93 may be provided. For example, a particular business model may opt to offer a standard and premium or economy offering where the feature sets of each are different. For example, an economy version may include minimal processing power such as a general purpose processor and a relatively smaller sized reconfigurable space 104. Thus, the economy version may not include certain soft processors or other advanced processing capabilities whereas a premium version may include extended processing capabilities including faster speeds of operation, relatively larger reconfigurable space 104, more sophisticated processing, etc.

The reconfigurable space 104 conceptually contains a plurality of unique information processing workspaces, collectively referred to by the reference numeral 116, each allocated to an associated peripheral 20. Thus, the information processing workspaces 116 are provided for peripheral-specific or application-specific functionalities that are not related to system core processes. By that, it is meant that the information processing workspaces 116 are provided for use by the peripherals 20, e.g., to offload hardware and/or software requirements that would otherwise be performed within the various peripheral 20 and/or for sharing resources among peripherals 20, etc. The system core 12 however, does not require the information processing workspaces 116 to perform its system core processes. Rather, the operations of the system core are performed by the processing logic and other control circuitry 93, which, as described in greater detail herein, may also include reconfigurable devices. For example, of the various information processing workspaces 116, a first unique information processing workspace 116A is allocated to a first peripheral, a second, different information processing workspace 116B is allocated to a second peripheral, and yet a third unique information processing workspace 116C is allocated to a third peripheral. Each peripheral may use its allocated information processing workspace 116A, 116B, 116C to perform different functionalities, e.g., based upon each peripheral's specific requirements.

Each information processing workspace 116 may comprise a combination of software and/or hardware. Software executable instructions are stored in memory for executing various software routines required by the associated peripheral 20. Additionally, data files, configuration files and other non-executable data may also be stored in memory. Each information processing workspace 116 may also include reconfigurable hardware for executing one or more hardware and logic functions required by the associated peripheral 20. Thus, some or all of the hardware requirements of the various peripherals 20, e.g., those peripherals 20 that are conventionally provided with hardware logic, can be offloaded to the control and interconnection system 10. For example, hardware based data processing, data conversion, arithmetic operations, decision logic, input and output conditioning, timers, controllers and other types of hardware functions that are traditionally built using specialized chips integrated into a given peripheral 20 can be loaded into the system core 12. Thus, development time, cost and size of peripherals 20 can be reduced because certain processing capabilities can be relocated from the peripheral 20 to the information processing workspace 116 of the system core 12 associated with that peripheral 20.

In practice, each information processing workspace 116 may be defined by at least one of an allocated portion of the hardware for supporting reconfigurable hardware programming and an allocated portion of the memory for supporting reconfigurable software programming, e.g., to implement peripheral defined functionalities for interaction with associated peripherals. Thus, the reconfigurable space 104 in general, and each information processing workspace 116 in particular, may contain aspects thereof stored in different physical locations on the system core 12. For example, software may be stored on a memory device for execution by the general purpose processor 110, and hardware may be implemented in one or more reconfigurable hardware devices such as field programmable gate arrays (FPGA), programmable gate arrays (PGA), Programmable Logic Arrays (PLA), Platform ASICs and other logic that can be reconfigured. One exemplary FPGA chip is manufactured by XILINX of San Jose Calif. Moreover, a given peripheral 20 may include logic including hardware, memory and/or software contained within the peripheral itself. As such, the total processing performed by a given peripheral 20, may be derived within the peripheral 20, within the system core 12 or partially within the peripheral itself, and partially within the system core 12, in any combination.

The supervising processor 106 is operatively configured to provide control information to at least one peripheral associated with the control and interconnection system 10 to coordinate performance characteristics of multiple peripherals based upon at least one determined operating condition as will be described in greater detail herein.

The supervising processor 106 further manages, maintains, controls and is otherwise responsible for the reconfigurable space 104. The supervising processor 106 ensures, e.g., via supervisory processes, that requests from a peripheral 20 to allocate new areas of the reconfigurable space 104, e.g., to establish a new information processing workspace 116 or for integration of new structures into an existing information processing workspace 116 are properly executed for use by the requesting peripheral 20. That is, the supervising processor 106 control the configuration of each allocated information processing workspace 116 based upon programming instructions that implement peripheral defined functionalities. For example, the supervising processor 106 may receive a request to allocate an information processing workspace 116 from the reconfigurable processing environment 102 to implement peripheral specific processing of a given peripheral. Such may occur during an initial installation of the control and interconnection system 10 via flash or other suitable programming by a central entity. A request to allocate the information processing workspace 116 may also occur post installation, e.g., as part of an upgrade or add-on feature, which may also be performed by the central entity or the new or upgraded peripheral may include programming instructions to configure or modify the allocated information processing workspace 116 with at least one of hardware and software configuration information if associated peripheral intends to use the reconfigurable processing environment 102 of the system core 12.

If the peripheral is new to the system, the supervising processor 106 then allocates an unused portion of the reconfigurable processing environment 102 for use by the associated peripheral sufficient to implement the programming instructions if the programming instructions are properly authorized, e.g., as verified using a security and diagnostics feature of the supervising processor 106, which will be discussed in greater detail below. The supervising processor then configures the allocated information processing workspace 116 based upon the programming instructions to perform at least one of function specific or peripheral specific applications. Moreover, during operation, the supervising processor 106 may control interaction with the allocated information processing workspace 116 to authorized peripherals or otherwise restrict access of the allocated information processing workspace 116.

The supervising processor 106 further ensures that information processing workspaces 116 are properly de-allocated and recaptured back to the reconfigurable work space 104, and to allow access to execute and/or modify processes within a previously allocated space by an authorized peripheral 20. As such, the supervising processor 106 performs or ensures that an appropriate processor performs the necessary authorization, cleanup and maintenance of the reconfigurable work space 104. The supervising processor 106 may be set up to only allow reprogramming or reconfiguration during a calibration period or cycle, or alternatively, a given peripheral 20 may have free or limited access to have their associated information processing workspace 116 reprogrammed.

Numerous peripherals 20 will likely utilize the reconfigurable space 104 to offload at least a part of their hardware and/or software processing requirements to the reconfigurable processing environment 102 of the system core 12. As such, the supervising processor 106 may implement a security processor to ensure that only authorized peripherals can gain access to each information processing workspace 116. For example, the supervisory processor may ensure that encryption or other data security measures are performed for proprietary or confidential information stored, configured or executed in each information processing workspace 116 including software stored in memory and hardware programmed into reconfigurable hardware devices.

In this regard, the supervising processor 106 may manage the rights of the various peripherals 20 to their associated information processing workspace 116, e.g., via a suitable security processor, to preserve restricted access, allow global or permissive sharing, etc., of some or all of the functionalities of each information processing workspace 116. Thus, some information processing workspaces 116 may be globally accessible to all peripherals, accessible to a predetermined class of peripherals, restricted to select peripherals or restricted for exclusive use by a select peripheral that requested the associated information processing workspace. For example, an exemplary peripheral 20 may be provided as software code only. However, that software code, which is executed in its information processing workspace 116 may utilize common or shared hardware and/or software, either in other shared information processing workspaces 116, or in external peripherals themselves, such as by transmitting data to an external display 42, an input output unit (I/O) coupled to the control and interconnection system 10, etc.

Moreover, the flexible nature of the reconfigurable processing environment 102, combined with the capability of turning over logical implementation of an information processing workspace 116 to an associated peripheral 20 allows that peripheral 20 to implement upgradeable and reconfigurable mission specific features and capabilities within the reconfigurable processing environment 102 of the control and interconnection system 10. For example, a peripheral 20 may provide specific features and/or services based customer demographic segments or other factors as will be described in greater detail below. Such specific features and/or services may be implemented in that peripheral's information processing workspace 116. However, the reconfigurability of each information processing workspace 116 allows the associated peripheral 20 to be upgradeable or cross gradable among multiple mission specific features, options, services, etc., without changing the hardware and/or software requirements of the components of the peripheral 20 external to the control and interconnection system 10. Rather, the peripheral 20 identifies the mission specific features available to the user and configures its associated information processing workspace 116 to those features. That is, where a third party or after market peripheral provider traditionally provides several models or versions of a product, that provider can now provide a single hardware device and off-load the product differentiating features and/or unique processing of each version to an associated information processing workspace 116 within the system core 12. Thus, OEM and aftermarket products that are not traditionally upgradeable or cross-gradable can now be modified to the extent that the modifiable processing is performed within the system core 12 of the control and interconnection system 10.

In order to provide consistency and to simplify hardware design for various peripherals, the system core 12 may also provide one or more specialty processors 108. For example, one or more specialty processor(s) 108 may be communicably coupled with and responsible for controlling the reconfigurable devices of the reconfigurable processing environment 102 based upon reprogramming instructions from associated peripheral 20, e.g., after being authorized by the supervising processor 106. As such, the peripherals 20 do not have to deal with the responsibility and overhead of programming the programmable devices in the reconfigurable space 104 themselves. Rather, the peripherals 20 need only provide the corresponding specialty processor 108 with a description of the logic to be implemented by hardware within the information processing workspace 116 allocated to that peripheral 20, and the corresponding specialty processor 108 will see to it that the code is formatted in a manner suitable to the particular requirements of the particular programmable devices.

As another example, one or more specialty processor(s) 108 may optionally implement a soft core processor such as a MICROBLAZE, which may be embedded in an XLINX chip to handle fast time intensive processing. Thus, a peripheral 20, such as an obstacle detection device, that may require fast processing is suitably served by such soft core functionalities. Specialty processors 108 may also be used for data intensive applications such as audio and/or video processing, e.g., by implementing a reduced instruction set chip (RISC) device, an advanced RISC machine (ARM) or other processor or logic in a reprogrammable device such as an FPGA.

In practice, the functionalities described in greater detail herein for each of the processors 106, 108 and 110 and the data engine 112 may be implemented on one or more logic devices such as a microprocessor or microcontroller. For example, a. single processing logic device may implement the functions of two or more processors 106, 108, 110. Likewise, in practice, the functions implemented by the processors 106, 108, 110 may be distributed across more than one processing logic device. Still further, each of the processors and data engine, 106, 108, 110 and 112 may be implemented by a unique processing device.

Moreover, the processors and data engine, 106, 108, 110 and 112 may be implemented as a conventional processor, e.g., a RISC processor, or realized in an FPGA within the reconfigurable processing environment 102. The use of an FPGA to realize one or more of the processors and data engine, 106, 108, 110 and 112 allows appropriately sized data paths, address paths, registers, pipelines and processing functionality for the specific applications implemented. As such, certain computational efficiencies may be realized using an FPGA compared to a traditional general purpose microprocessor in that an FPGA constructed processor may be architecturally tailored for specific processing applications, resulting in decreased execution time due to the more efficient structure. Further, the processor 110 may take advantage of multiple parallel interface buses as best illustrated in FIG. 3, to provide computational efficiencies that may not be available in traditional processors.

The data engine 112 interacts with the development library 114 for supplying partially and/or completely defined building blocks, e.g., to configure the information processing workspaces 116 so that associated peripherals can offload at least a portion of their hardware or software requirements to their corresponding information processing workspace 116 by utilizing the pre-configured building blocks. For example, the development library 114 may predefine hardware and/or software functions that may be drawn upon in a "plug and play" manner so that development time for applications to be loaded into the information processing workspace 116 of an associated peripheral 20 is reduced. For example, the data engine 112 may interact with the development library 114 to implement input ports, output ports, bus architectures, common or standard processing functions such as arithmetic logic units (ALU), multipliers, filters, memory such as RAM, etc. Partially and completely defined building blocks, as well as exemplary configurations may be provided in the library 114. Further, the development library 114 may comprise software code, data files, data structures and other memory related information including software code and software library functions that may be executed on a specialty processor 108 or general purpose processor 110.

The data engine 112 also interacts with the configuration library 115 to pass configuration data to at least one of the general purpose processor 110 and the supervising processor 106. For example, the configuration library 115 may be utilized to provide customer or vehicle operator options, preferences and demographic segments. The data engine 112 may pass the appropriate data from the configuration library 115 to any one or more of the processors 106, 108, 110, to one or more of the information processing workspaces 116, or the data may be communicated to the peripheral 20 to which that configuration data pertains. For example, the configuration library 115 may store user-defined driving preferences that may be communicated to the vehicle suspension system, steering subsystem, body subsystem, multimedia systems etc., to customize the performance and convenience features of the vehicle in a manner that is unique to a particular vehicle operator. The configuration library 115 may also store codes that selectively enable or disable features of peripherals 20 based upon vehicle owner or operator purchased, leased or licensed options, and/or parameters that define the capabilities of peripherals 20 available to the control and interconnection system 10. For example, groups of peripheral features may be bundled into demographic segments, which may be purchased, licensed or leased based upon the vehicle owner or operator's needs or desires as will be explained in greater detail below.

With reference generally back to FIG. 1, it is possible that sensitive information can be communicated to the system core 12. To preserve the confidentiality of such data, the input module 14 may be reprogrammable, e.g., via FPGAs or conceptually or otherwise allocated into global input ports and local input ports. The local input ports may be dedicated to specific peripherals for coupling those peripherals to their corresponding information processing workspaces 116. Similarly, the output module 16 may be programmably, conceptually, or otherwise allocated into global and local outputs in a manner analogous to that of the input module 14.

The open, reconfigurable hardware and software architecture of the reconfigurable processing environment 102 offloads the burden and expense of hardware development that would otherwise be required to bring a peripheral 20 to market. Moreover, the provision of the development library 114 of common functions, processing blocks and algorithms avoids the cost of independently developing common components or building blocks that may be useful in processing tasks performed by various peripherals 20, thus enabling developers to focus on the development of particular mission defining characteristics of each particular peripheral 20. Moreover, developers are not forced to conform to any specific design standards, protocols or other hardware or software limitations within the minimal restrictions imposed upon each peripheral 20 by the space limitations of their particular information processing workspace 116 and the code requirements for programming their particular information processing workspace 116.

System Core Architecture

Figure 6:
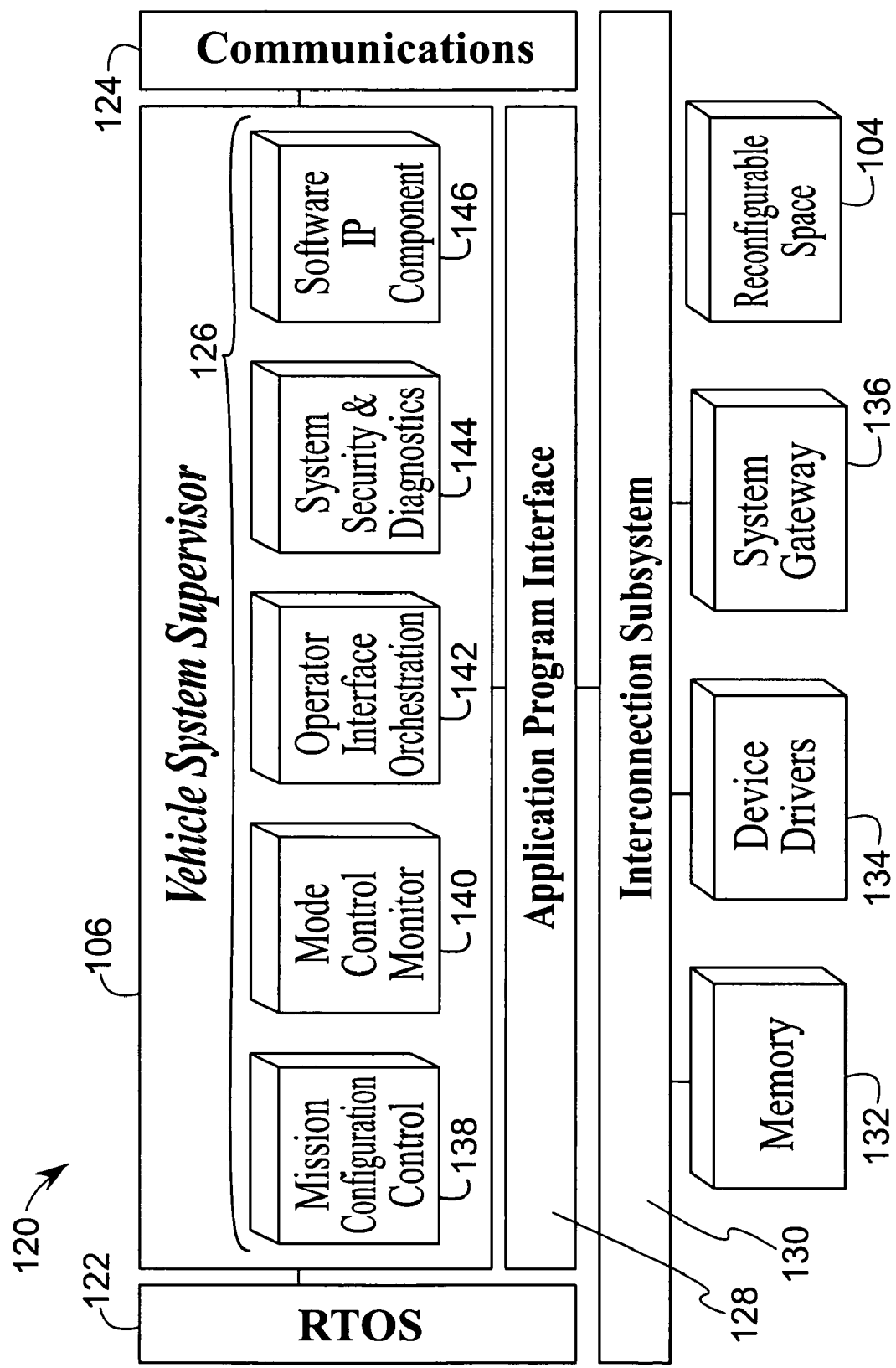
FIG. 6 is a block diagram of some exemplary processes for managing a reconfigurable processing environment of the control and interconnection system of FIG. 1.

The control and interconnection system 10 may be implemented so as to strike a balance between centralized and distributed processing. One aspect of the control and interconnection system 10 that enables such balance is the ability of the vehicle supervising processor 106 to oversee other controllers associated with peripherals 20 and to supervise and control functions of the reconfigurable space 104 of the system core 12. FIG. 6 illustrates an exemplary architecture 120 of certain elements of the system core 12, including some of the functional components that are shown in FIG. 5, which illustrate one exemplary implementation of the supervising processor 106 and at least certain of its corresponding interconnections. The architecture 120 includes generally, a real time operating system (RTOS) 122, a communications interface 124, the supervising processor 106, which is also referred to herein as a Vehicle System Supervisor (VSS) 126 to better distinguish its various exemplary functional components discussed below, an application program interface (API) 128, an interconnection sub-system 130, one or more memory devices 132 such as flash memory, device drivers 134, a system gateway 136 and the reconfigurable space 104 discussed above with reference to FIG. 5.

With reference to FIGS. 5 and 6 generally, the RTOS 122 may be operated on the general purpose processor 110 illustrated in FIG. 5, or on a suitable processor provided elsewhere on the system core 12. The RTOS 122 provides an operating system for executing software, services and other functions provided by the control and interconnection system 10 and the various peripherals 20 connected thereto. For example, the RTOS may be configured to run Windows CE by Microsoft Corporation of Redmond Wash., LINUX such as by Red Hat of Raleigh N.C., QNX Neutrino by Harmon International Company of Ottawa, Ontario, etc.

The communications interface 124 provides a communication path for the reconfigurable processing environment 102 to communicate with other components of the control and interconnection system 10, including for example, other logic provided in the system core 12, the input module 14 and/or the output module 16 (best seen in FIG. 1). With reference back to FIG. 6, the VSS 126 comprises a mission configuration control process 138, a mode control monitor 140, an operator interface orchestration process 142, a system security and diagnostics process 144 and a software component process 146 that collectively function together to oversee the operations performed in the reconfigurable space 104.

Under one exemplary arrangement of the VSS 126, the mission configuration control process 138 provides configuration data to peripherals 20 associated with the control and interconnection system 10 and/or to one or more of the processes of the processing logic and other control circuitry 93 to oversee integrated operation or otherwise coordinate performance characteristics of various peripherals 20, e.g., based upon entered preference data. The mission configuration control process 138 may also receive commands issued by the peripherals 20 for access to the reconfigurable space 104. Commands issued by a given peripheral 20 that are suitably passed by the mission configuration control 138 are inspected by the system security and diagnostics process 144. The system security and diagnostics process 144 insures that the specific configuration requested by or required by the peripheral 20 is authorized and configured to execute properly within the core 12. The control and interconnection system 10 may further integrate with a graphical user interface 42 (best seen in FIGS. 1 and 9) such that an operator can modify the operator preferences. Further, an operator may alter the operator preferences based upon data stored on a portable memory device that may be temporarily docked, e.g., on a docked unit 32 or other suitable memory reading device, for reading by the system core 12.

Moreover, during run-time, the system security and diagnostics processor 144 may be utilized to ensure that a given peripheral 20 has suitable permission or is otherwise suitably authorized to access a requested information processing workspace 116. For example, the security and diagnostics processor 144 may be utilized to determine whether a configuration operates correctly based upon at least one of mission configuration settings identified by a mission configuration controller 138, configuration commands based upon driver settings and alternate parameters provided by the mode control monitor 140, which is discussed below.

The mission configuration control 138 may also be customized and then fixed for an individual customer, such as a vehicle owner or operator, e.g., according to preferences, performance data and options such as those that may be stored in the configuration library 115. For example, performance parameters of included peripherals 20 may be determined through driving the vehicle and by performing simulator tests, such as may be determined when the control and integration system 10 is integrated into an associated vehicle. Thus, the mission configuration provides supervision of the customized vehicle systems.

The mode control monitor 140 modifies the command issued by the peripheral 20 to the system security and diagnostics 144 based upon detecting a particular operating mode or triggering event, i.e., performance characteristics, as will be described in greater detail herein. The mode control monitor 140 is further operatively configured to dynamically modify the control information based upon at least one determined operating condition, e.g., based upon at least one of sensed operational conditions, inferred operational conditions, sensed environmental conditions and inferred environmental conditions. The operator interface orchestration process 142 provides a graphic user interface for an operator, technician or installer to communicate with the system core 12, e.g., during development, testing and/or programming of a specific information, including programming a specific information processing workspace 116. The software component 146 securely retrieves and stores software components of the information processing workspaces 116 under the supervision of the VSS 126.

The API 128 advances development of functions and features of third parties by allowing programmers and peripheral providers the capability to interact with existing software using predefined procedures, instructions and other forms of software to quickly and/or reliably build code that is compatible with the system core 12. Documented APIs for application classes, documented host/processor communication protocols, proven libraries of code, support packages and drivers may be provided with, and accessible from the system core 12. Moreover, the system core 12 simplifies the design and development of peripheral features by handling and executing some or all aspects of the peripheral hardware and software infrastructure, e.g., using the information processing workspaces 116 described more fully herein.

The interconnection subsystem 130 facilitates communications across both local and remote connections. For example, local (direct) connections may couple the control and interconnection system 10 to sensors, actuators, displays, input/output (I/O) devices. Further, services and other features may be implemented across the CAN bus 78, LIN bus 80 or other communication pathway. Thus, control and/or data communication links can be established between the control and interconnection system 10 and vehicle brakes, suspension, steering, airbag, and other vehicle operative features across a common communications pathway. Memory 132, e.g., flash memory, may be used to store information required by the system core 12, including data required by the RTOS 122 and/or software corresponding to the various information processing workspaces 116 for various peripherals 20. The flash memory 132 may communicate with the RTOS 122 via the interconnection subsystem 130 or other suitable communications data path. Device drivers 134 or other software code may be accessed by the various processors of the control and interconnection system 10 via the interconnection subsystem 130 to obtain instructions on how to interact with the various peripherals 20 installed in the system, thus the particular device drivers 134 will be application specific.

The system gateway 136 is the operational access port or communications hub for signals entering and exiting to the vehicle system supervisor 126 from the other logic of the system core 12. The system gateway 136 may provide necessary communication protocol conversion and message priority implementation, perform other operations to properly translate data as required by the specific implementation and/or serve as a master message controller. The implementation of a master message controller may be used to enable the different characterizations of supervision described in greater detail herein. This supervision oversight promotes vehicle intelligence and opens up an almost infinite variety of information transmission and control possibilities. A few examples presented for illustration, and not by way of limitation include:

a. Off road driving conditions are sensed, thus the Supervisor, e.g., VCC 126, alerts the appropriate vehicle subsystems 34 for proper vehicle dynamic & powertrain control ranges & settings;

b. GPS & terrain map indicates approaching a hill to climb, thus the Supervisor alerts a hybrid powertrain for best torque/energy consumption;

c. Vehicle body windshield wiper senses rain, thus the Supervisor communicates with Brakes and vehicle dynamics controls to compensate for potential slippery conditions;

d. Roadside transmitter alarms the vehicle of icy conditions, thus the Supervisor informs the vehicle operator and communicates appropriate adjustments to the vehicle dynamic system;

e. A truck payload changes, thus the Supervisor calls for the vehicle suspension to be lowered and powertrain torque to be changed.

Figure 7:
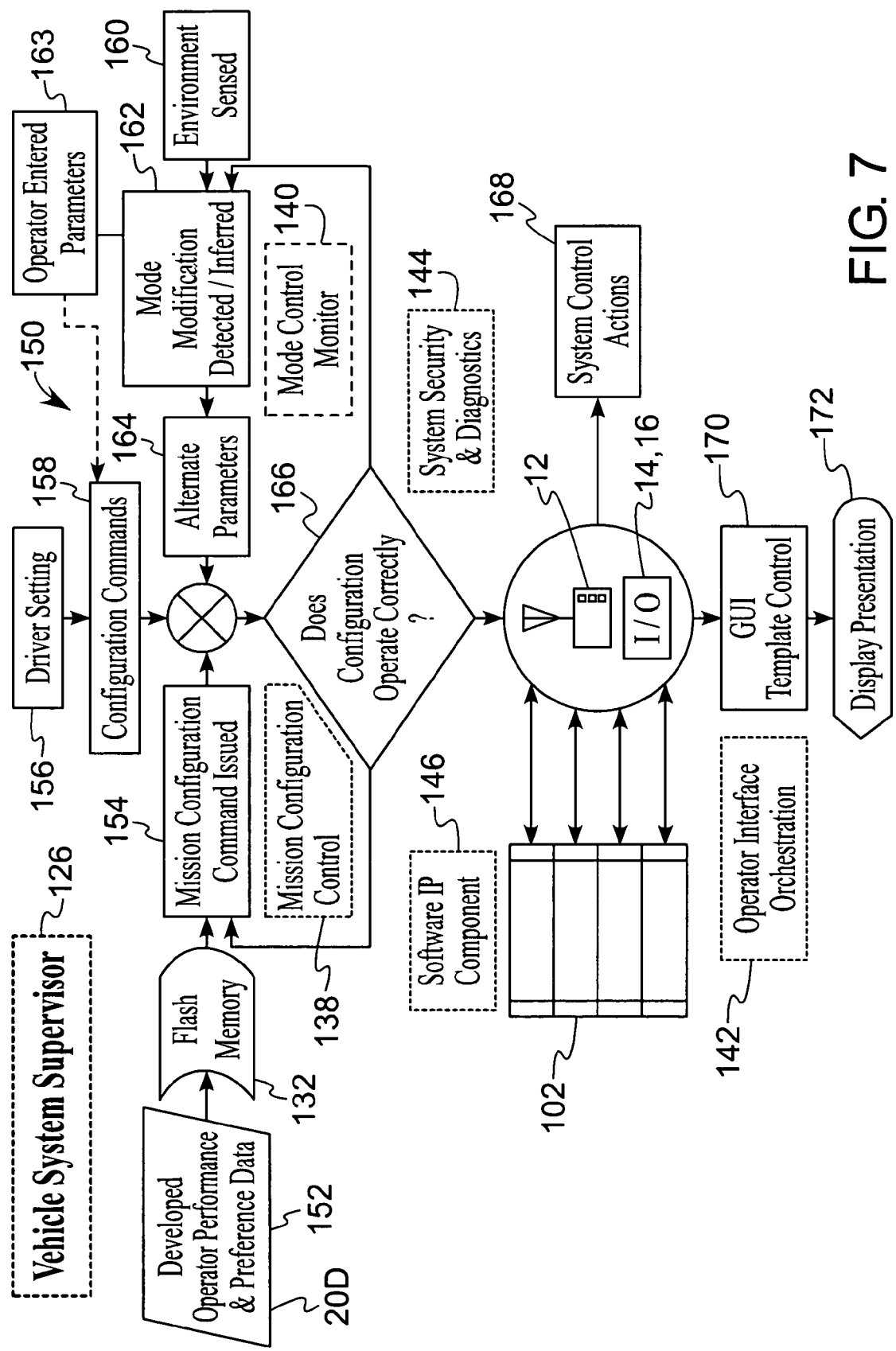
FIG. 7 is a flow chart illustrating the integration of peripheral with the control and interconnection system of FIG. 1.

Referring to FIG. 7, a flow chart 150 illustrates one exemplary interaction between a peripheral 20 and the control and interconnection system 10. Peripheral 20D provides vehicle operator performance and preference data 152 for adjusting the operating characteristics of a vehicle based upon operator preferences. The performance and preference data may be loaded into the Flash memory 132, e.g., in a reserved memory area allocated as part of the information processing workspace 116 associated with the peripheral 20D. At some point during operation of the control and interconnection system 10, a mission configuration command 154 is issued to the mission configuration control process 138 and the vehicle operator performance and preference data 152 is read out from the flash memory 132 via the mission configuration control process 138.

In addition, relevant software driver settings, e.g., from the device drivers 134, are retrieved at 156 and other related or necessary configuration commands are obtained at 158 e.g., as executed by other system configuration commands, such as those controlled by the vehicle system supervisor 126 to facilitate interaction between the control and interconnection system 10 and the peripheral 20D. Still further, the mode control monitor 140 may provide additional parameters or parameter modifications, e.g., as a result of sensing the environment at 160, detecting or inferring mode modifications at 162, or via providing alternative parameters at 164. For example, a mode may change via one or more operator entered parameters at 163 such as off road or sport selections. Thus, the mission configuration process 138 and mode control monitor 140 may cooperate to dynamically modify configuration data during vehicle operation, e.g., based upon at least one of sensed environmental conditions, inferred environmental conditions, sensed operating conditions, inferred operating conditions and operator preference data.

Determined operating conditions used by the supervising processor 106 to provide control information to the peripherals associated with the control and interconnection system to coordinate performance characteristics of multiple peripherals may be based upon operator preference data. For example, operator entered parameters 163 may be considered at 162 by detecting the operator values. As yet another example, operator entered parameters 163 may affect or otherwise influence configuration commands at 158. Also, new condition(s) may be detected, such as by receiving an email at an Internet hot spot. Yet another example is that a mode may change as a result of sensed operational conditions, inferred operational conditions, sensed environmental conditions or inferred environmental conditions. For example, conditions may be inferred from data analysis, such as slippery road conditions as inferred by data from an automatic braking system (ABS) setting. Thus, according to at least one aspect of the present invention, the VSS 126 controls hierarchical communications networks whose overall vehicle system configuration is customized and responsive to both operator selections and environmental conditions, which may be both sensed and inferred.

The system security and diagnostics processor 144 then examines the available data to attempt to determine whether the new configuration operates correctly at 166, e.g., within some predefined bounds, rules or other suitable operating characteristics. If the system security and diagnostics processor 144 does not approve the configuration, feedback is supplied to the mission configuration control processor 138 and/or the mode control monitor 140 to either bring the data into compliance or abort the operation, e.g., if invalid or improper authorization was given, etc. If the system security and diagnostics processor 144 authorizes the configuration, then the supervisory processor 106 implements various supervisory tasks, e.g., by providing control information to at least one peripheral associated with the control and interconnection system 10 to coordinate performance characteristics of potentially unrelated peripherals based upon at least one determined operating condition, e.g., the new configuration in the above example. Moreover, access may be granted to the various processing capabilities of the peripherals 20, e.g., to access the system core 12 including their associated information processing workspaces 116. For example, permission may be granted for the peripheral 20D to access the information processing workspace 116 associated with peripheral 20D in the reconfigurable processing environment 102.

Additionally, system core 12 may take various control actions at 168 in the course of executing the software and/or hardware of the peripheral 20D. Moreover, the driver interface orchestration process 142 may provide a template control, e.g., via a graphic user interface (GUI) 170 and access a display 172 to provide visual, audible or other feedback to an operator, e.g., to modify, i.e., update, upgrade, access, install or remove the software and/or hardware corresponding the peripheral 20D.

Figure 8:
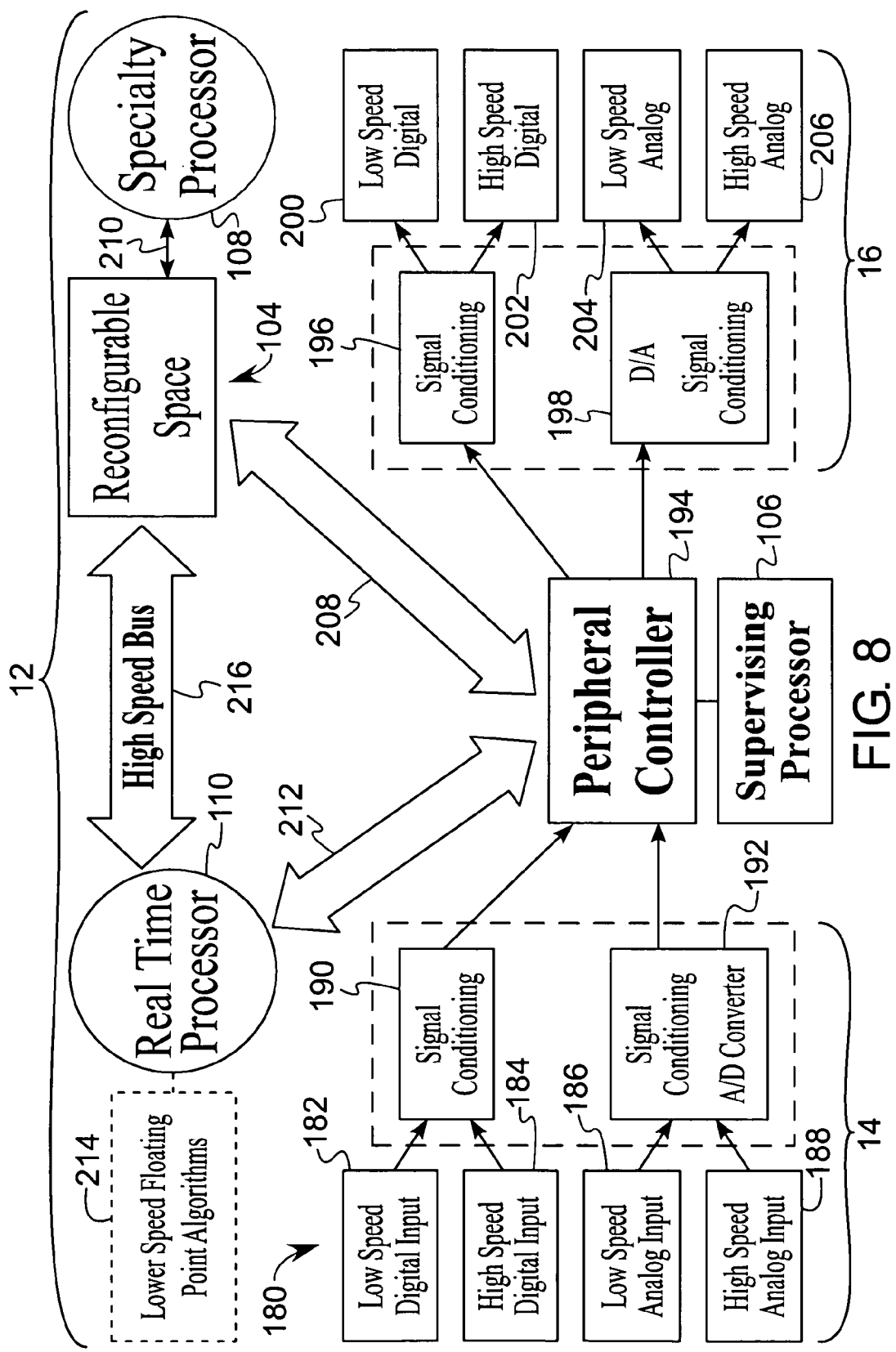
FIG. 8 is a general block diagram of data flow in the control and interconnection system of FIG. 1.

Referring to FIG. 8, a block diagram 180 illustrates data flow diagram of an exemplary control and interconnect system 10 to illustrate an approach to coupling data received at the input and output modules 14, 16 to the system core 12, and in particular, to the reconfigurable space 104. As illustrated, data from peripherals 20 may be input to the input module 14 in a variety of formats. For example, the input module 14 may include data paths corresponding to low speed digital information 182, high speed digital information 184, low speed analog information 186 and/or high speed analog information 188. The input module 14 may condition the high and low speed digital information 182, 184, e.g., to synchronize, filter or perform other necessary processing using digital signal conditioning 190. The input module 14 also processes high and low speed analog data 186, 188. The analog input information is also conditioned and converted to a digital representation, e.g., using analog to digital conversion by an analog conditioning processor 192.

The input module 14 couples the conditioned (and converted) input information to a peripheral controller 194, which servers as a hub of the system core 12 for process interaction and may be implemented, for example, in the processing and support circuitry 93 of the system core 12. For example, using the peripheral controller 194, select input signals at the input module 14 are associated with their associated information processing workspace 116 in the reconfigurable space 102 of the system core 12. The peripheral controller 194 also communicates output data to the output module 16, which may condition the data for digital transmission. For example, the output module 16 includes a digital data output conditioning processor 196 for conditioning digital output data. Further, the output module 16 may also include an analog output processor 198 that performs digital to analog conversion and suitable signal conditioning to process the converted analog data. In a manner complimentary to the input module 14, the output module 16 includes several data paths corresponding to low speed digital data 200, high speed digital data 202, low speed analog data 204 and high speed analog data 206.

The peripheral controller 194 further communicates with the various processors of the system core 12. For example, as illustrated, input data, control data and output data may be communicated along a first communication path 208 between the peripheral controller 194 and the reconfigurable space 104, e.g., to reprogram or modify an information processing workspace 116, or to access an information processing workspace 116, e.g., to execute hardware logic or software code. The specialty processor 108 may access the reconfigurable space 104, e.g., via a second communications path 210 to facilitate reprogramming etc. as noted in greater detail herein. For example, the specialty processor 108 may implement ARM-like or VLIW-like capabilities, e.g., for audio or video applications or softcore processing, as implemented in an FPGA for time intense processing.

The peripheral controller 194 may also communicate with the general purpose processor 110, which also referred to herein as a real time processor via a data bus 212. The processor 110 may execute functions of the system core 12 and may optionally utilize a floating point processor 214 for executing relatively lower speed floating point algorithms.

The processor 110 further interacts and communicates within the reconfigurable processing environment 102 including the memory associated therewith, e.g., over a high speed data bus 216 such as a PCI bus.

The peripheral controller 194 further interacts with the supervisory processor 106 to ensure that information routed between the input module 114, the output module 116, the reconfigurable space 104 and the general purpose processor 110 is suitably authorized and is delivered along the appropriate communication pathways. For example, the supervisory processor 106 may cooperate with the peripheral controller 194 to ensure that information from a predetermined peripheral 20 is coupled to its associated information processing workspace 116, and that output from the reconfigurable space 104 and/or the general purpose processor 110 is coupled to the corresponding and authorized peripheral 20 via the output module 116.

Thus, the peripheral controller 194 is arranged to direct the flow of information in the control and interconnection system 10 by communicating data between the input module 14, the output module 16, and at least one of the reconfigurable space 104 and the general purpose processor 110, wherein select input signals at the input module 14 are associated with their associated information processing workspace 116 in the reconfigurable space 104 of the system core 12. Further, the general purpose processor 110 may be utilized to interact with the memory of the reconfigurable space 104, e.g., via bus 216 in addition to executing functions of the system core 12.

Figure 9:
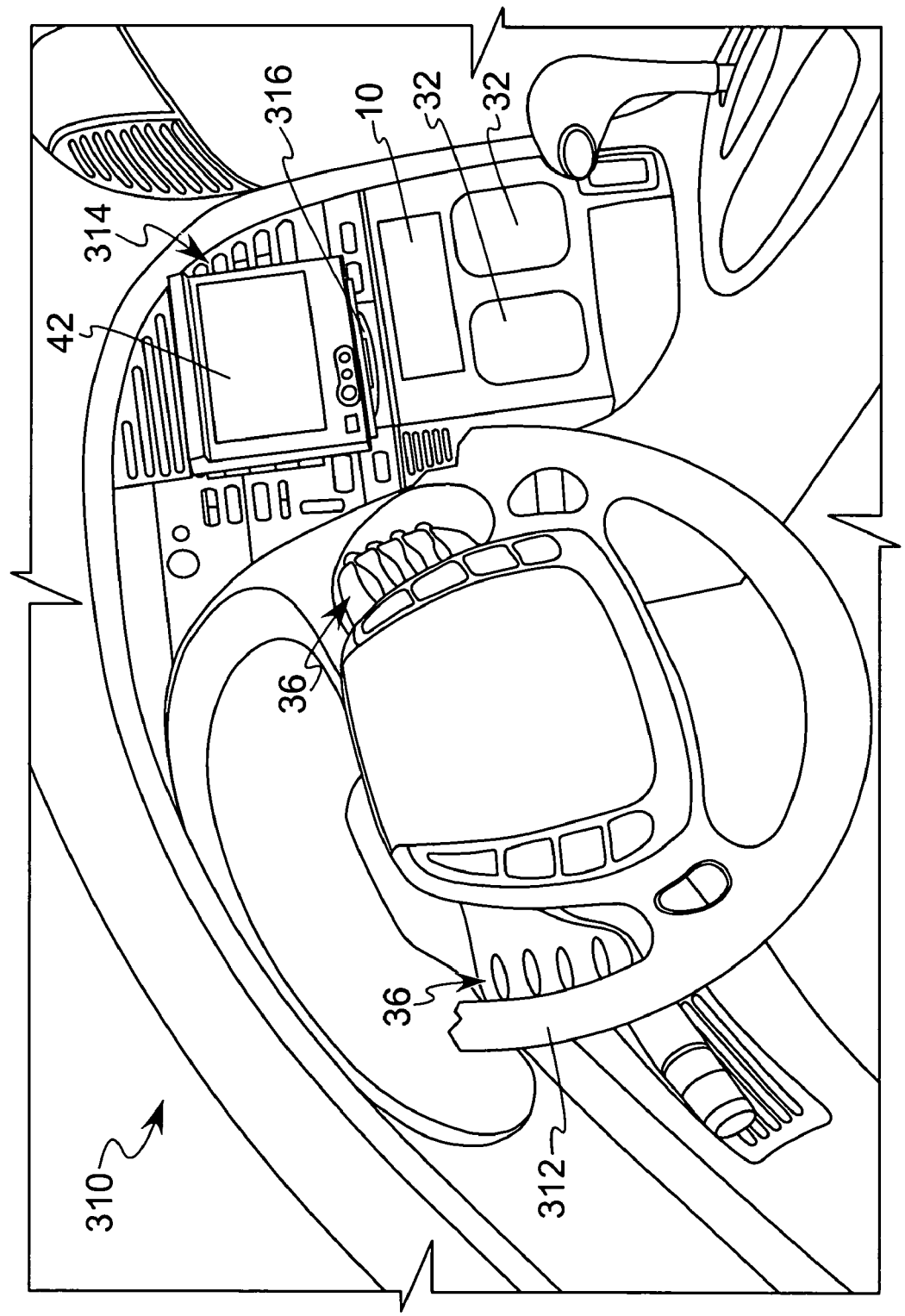
FIG. 9 is an automobile interior including the control and interconnection system according to an aspect of the present invention.

Referring to FIG. 9, the control and interconnection system 10 is installed in an exemplary vehicle 310 to illustrate its integration with the vehicle 310 and several exemplary peripherals 20. In practice, the control and interconnection system 10 may be located behind the dash, in a passenger kick area, integrated into an add-on display or other device, in a compartment in a trunk of the vehicle, or other practical position, depending upon the vehicle and other system integration factors. Input and output peripherals 20 to the control and interconnection system 10 may be ergonomically engineered into the vehicle design, e.g., by including input/output control peripherals 20 on the steering wheel, in dash, in the doors, trunk or other suitable location. For example, as illustrated, input/output control peripherals 20 are implemented as several switches 36 that are provided on a steering wheel 312 and on a console 314. Moreover, control peripherals, including inputs and outputs can be distributed throughout the vehicle. This arrangement allows efficient sharing of resources in key locations within the vehicle 310, e.g., to provide a common or shared display in the vehicle dash, to provide a common data entry port, etc.

For example, as illustrated, a shared display may be attached or otherwise coupled to the console, e.g., via an after-market adaptation. Alternatively, the shared display 42 may be integrated into the console 314. Alternatively, the Several docked units 32, such as a personal data assistant (PDA) and a cellular telephone are docked in appropriate cradles that are interconnected to the control and interconnection system 10 through the console 314. A drive device 316 provides an input for integrating removable media to the control and interconnection system 10, e.g., for updates, new installations etc. The interoperability of the various aspects of the present invention allow sharing of resources in an efficient manner such that available space, e.g., which is otherwise consumed with redundant aspects of processes, such as power supplies, processors, memory, etc. is off-loaded to the system core 12, thus numerous functionalities can be provided in a relatively small and clean footprint.

The Home Office Travel Interconnection Executive

Various aspects of the present invention allow the control and interconnection system 10 to be integrated with fixed peripherals 20 in combination with in-vehicle peripherals 20. Thus, peripherals 20 may be in fixed locations, e.g., at a home or office location, and such peripherals 20 may integrate with the control and interconnection system 10 when the vehicle is in suitable proximity to the fixed peripheral 20. In this regard, communication may be implemented, for example, via the transceiver 18 coupled to the system core 12.

As one example, a home base receiver, such as may be implemented in an audio receiver or player may communicate music to a hard drive peripheral 20 within the vehicle and that is coupled to the control and interconnection system 10. Other performance features and services may also be incorporated into fixed peripherals 20 and may be ported from home or office to on-the-road features.

Further, the control and interconnection system 10 is not limited to vehicle applications. Rather, the control and interconnection system 10 may be applied to control and oversee peripherals 20 in other applications, such as where it is desirable to provide a control and interconnection system 10 for the sharing of resources including processing logic, input/output, power, wiring, etc. For example, in a home application, the supervising processor 106 may be implemented to oversee home functions in a hierarchal approach analogous to that for the vehicle application described with reference to FIG. 2 except that each class (52-62 shown in FIG. 2) is represented by a class suitable for a home application, such as lighting and climate control, home computing center functions, kitchen and other household appliances including smart appliances, security features, infotainment peripherals and other miscellaneous home, office or other peripherals of interest. In this regard, the control and interconnection system 10 operates analogously to that described above for vehicle applications where one likely difference is the types of peripherals 20 that connect to the control and interconnection system 10.

Miscellaneous Considerations

The system core 12 may be constructed so as to be capable of utilizing standard off the shelf (OTS) filters, data translation blocks and other software and hardware components including standard off-the-shelf FPGAs and FPGA libraries for both hardware (via the reprogrammable devices) and software development. Moreover, peripheral support may be modularized. For example, simple peripherals 20 may connect directly to the reconfigurable processing environment 102 via the input and output modules 14, 16. Alternatively, peripherals 20 may communicate with the control and interconnection system 10 via a suitable bus architecture, such as the CAN bus 78 or LIN bus 80. As such, inputs and outputs from the input and output modules 14, 16 need not be allocated uniquely to each peripheral 20 of a particular system.

Moreover, an FPGA or other programmable device may be used to implement and handle system control and data manipulation, e.g., the bus controllers for the CAN and LIN buses 78, 80, and the input and output modules 14, 16. Thus, the inputs and outputs of the control and interconnection system 10 may be reconfigurable themselves. That is, the input module 14 may comprise reconfigurable hardware such that inputs 22 of the input module 14 can be rerouted to different paths within the system core 12 and the output module 16 comprises reconfigurable hardware such data paths from the system core 12 can be rerouted to different outputs 40. Such a feature may be used to accommodate additional or future additional peripherals 20 added to the control and interconnection system 10 and/or to modify permissions or authorizations of various peripherals to the control and interconnection system 10.

The reconfigurable processing environment 102 allows the control and interconnection system 10 to perform vehicle specific reprogramming to add, implement, upgrade, cross grade or otherwise modify functions defined by supported peripherals 20 including device services, software and applications, including defining the appropriate processing logic and suitable interconnections thereto. For example, the control and interconnection system 10 may configure the input and output modules 14, 16 as well as an information processing workspace 116 to function as a controller, a complex signal processor or other real-time controller for one or more peripherals 20. Notably, this can be accomplished without the performance penalties (non-optimal execution penalties) of traditional general purpose PC computer based platforms. Moreover, the control and interconnection system 10 can reconfigure itself each time the mission of the vehicle changes, e.g., if new peripherals 20 are added, removed updated or upgraded to account for changes in the desired functionalities and/or permissions of associated peripherals 20.

Various aspects of the present invention allow design houses, OEMs, etc., to develop and sell peripheral products that integrate with the control and interconnection system 10 so as to simplify, reduce and/or eliminate redundant aspects of coexisting (and traditionally non-integrated) components, devices, products and services, which may reduce development time and cost to bring a new, updated or upgraded peripheral to market. For example, as noted in greater detail herein, the control and interconnection system 10 may include necessary power supplies, signal conditioning, display devices, I/O devices, data storage devices, processing and other features that are accessible and integratable into the various peripherals thus eliminating the need for associated peripherals 20 to incorporate their own redundant versions of such features. Thus, the control and interconnection system 10 provides an environment in which aftermarket goods and service providers can integrate features into an equipped vehicle generally as seamlessly as OEM manufacturers.

Moreover, the control and interconnection system 10 does not impose task specific standards and boundaries on third parties and OEM manufacturers that plug into the system core 12. Instead of imposing standardized technology boundaries, the system core 12 only requires that device processor and logic implementations are compliant within the architectural limitations of the system core 12 and available instructions sets. Further, for each OEM or aftermarket provider, development of hardware for implementation in their allocated information processing workspace 116 may be reduced to using graphical and text based design tools and programming languages for logic component definition, using for example, hardware development language (HDL) to register transfer level (RTL) code. That is, the OEM or aftermarket provider is responsible for determining how their allocated information processing workspace 116 is utilized.

Development Environment

To enable fast market feedback for product development and evolution by OEM, aftermarket providers, etc., a development environment may be provided, that can accommodate office as well as laboratory capability. The programming tools available for configuring an allocated information processing workspace 116 in the reconfigurable space 104 may be implemented depending upon the application, to use common, well understood programming and development interfaces such as simple graphic software interfaces, e.g., similar to Matlab or LabView, for the non-technical programmer. The software may also be modular, e.g., based upon the Unified Modeling Language™ (UML). Other software visualizing, constructing and documenting languages may alternatively be used including an object oriented programming language such as C++, or a design wizard. Such approaches avoid the necessity of a developer to learn a specialized language such as HDL. Further, builder and other development software applications can be utilized to convert the user-created code into the appropriate program instructions to program the reconfigurable space 104 in a manner that is specifically tailored to the particular programmable hardware provided in the system core 12.

In the control and interconnection system 10, a single entity may maintain very tight control of key aspects of the vehicle network including the system core 12, thus maintaining tight security and encoding of the various hardware and software applications stored therein. This may be accomplished in a manner that provides OEM and aftermarket providers the tools required to define the hardware and software functions to be executed in their allocated information processing workspace 116 on the system core 12. Moreover, OEM and aftermarket manufactures may safely and confidentially install and operate proprietary code, algorithms and hardware configurations in their associated information processing workspace 116 outside the visibility of other installed peripherals 20, including those of competitors.

Exemplary Method of Operating a Business Based Upon the Control and Interconnection System The ability of effect rapid technology adaptation and new business dynamics is necessary to keep pace with the rapid advancement of electronic enabling technologies and the increasing pace of feature development anticipated as vendors begin to exploit the capabilities of the control and interconnection system 10. As such, an organizational structure may be desired where concepts can be created, rapidly developed and deployed while leveraging external resources for efficient and effective use.

Figure 10:
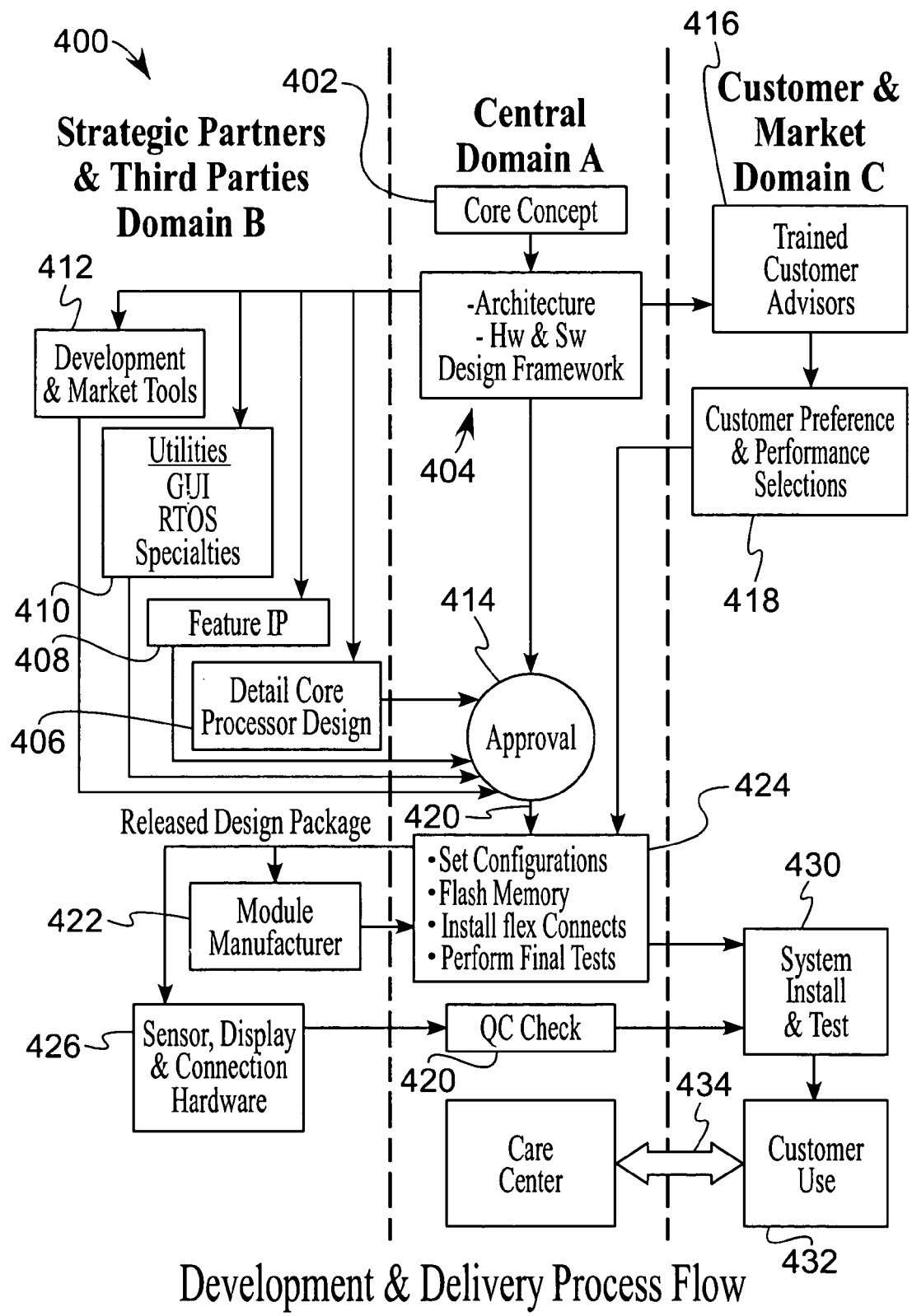
FIG. 10 is a process flow for the organization of a business model centered on the control and interconnection system according to various aspects of the present invention.

According to an aspect of the present invention, and with reference to FIG. 10, a flow chart of a business model 400 illustrates one exemplary method for leveraging the control and interconnection system 10 in a business environment. Three domains, which are designated herein as A, B and C are considered as illustrated in FIG. 10. 'A' defines a central domain, which may be a single central control entity and represents an enterprise, 'B' defines a strategic partners and third parties domain and 'C' defines a customer market domain. As one example, the details of the design and implementation of the control and interconnection system 10 may be maintained by the central domain A. The customer market domain C may be established to most effectively and efficiently bring the control and interconnection system 10 to market. The customer market domain may be initially centered on key customer segments to satisfy identified un-served wants and needs while further establishing a means to maintain ongoing connections with these customers for future upgrades, potential expanded services and loyal patronage recognition.

At 402, the core concepts of the control and interconnection system 10 are provided. As described in greater detail herein, the control and interconnection system 10 facilitates the adoption of features and functions in a flexible manner. One approach to bringing the control and interconnection system 10 to market is to offer standard and premium versions, light or full versions, etc., where each "version" may have different processing capabilities, resources, speed of operation, memory size, size of reconfigurable space 104 and other features as explained in greater detail herein. At 404, an architectural framework for each "version", e.g., premium, standard etc., of the control and interconnection system 10 is defined based upon the core concepts at 402. For example, as noted herein with reference to FIGS. 5 and 6, a tiered hierarchy may be utilized to establish a supervisory controller that oversees control of peripherals 20 and/or supervises the processing and support circuitry 93 of the system core 12, which promotes the control and operation of a multitude of simultaneous features and functions by the control and interconnection system 10 and its related peripherals 20. Integration and compatibility of otherwise seemingly diverse and unrelated peripherals 20, e.g., across and/or within classes of peripherals, may be implemented by customizing a unique control and interconnection system based upon operating parameters selected by an operator, where the operating parameters are selected from a set of available preferences by qualifying peripherals prior to integration into the control and interconnection system.

One aspect of the business model 400 is the ability to respond quickly and economically to satisfy market goals, dynamics and customer desires. As such, the business relationships between the central domain A and the strategic partners and third parties domain B will run the gamut from strategic partners that will bring technology and investment to simple third parties offering technology and development, which may be used as a gateway to broader market opportunities.

At 406, the central domain A develops and maintains versions of the control and interconnections system 10. At 408, typical aftermarket types of peripherals 20, e.g., remote start controls, etc. may be modified to be seamlessly integrated within the control and interconnection system 10. For example, an exemplary aftermarket product may offload some or all of its traditionally self contained data processing to the system core 12 to reduce cost and provide the appearance of an OEM product. Additionally the central domain may license certain parties and provide the means for them to convert their designs for integration compatibility into the control and interconnection system 10. At 410, several well-suited utilities may be included in the design to magnify the power of the control and interconnection system 10. For example, control and interconnection system templates may allow associated third parties to customize operator interaction with the control and interconnection system, e.g., by creating stylized designs such as GUIs. Other development tools and environments may also be provided as set out in greater detail herein.

Figure 11:
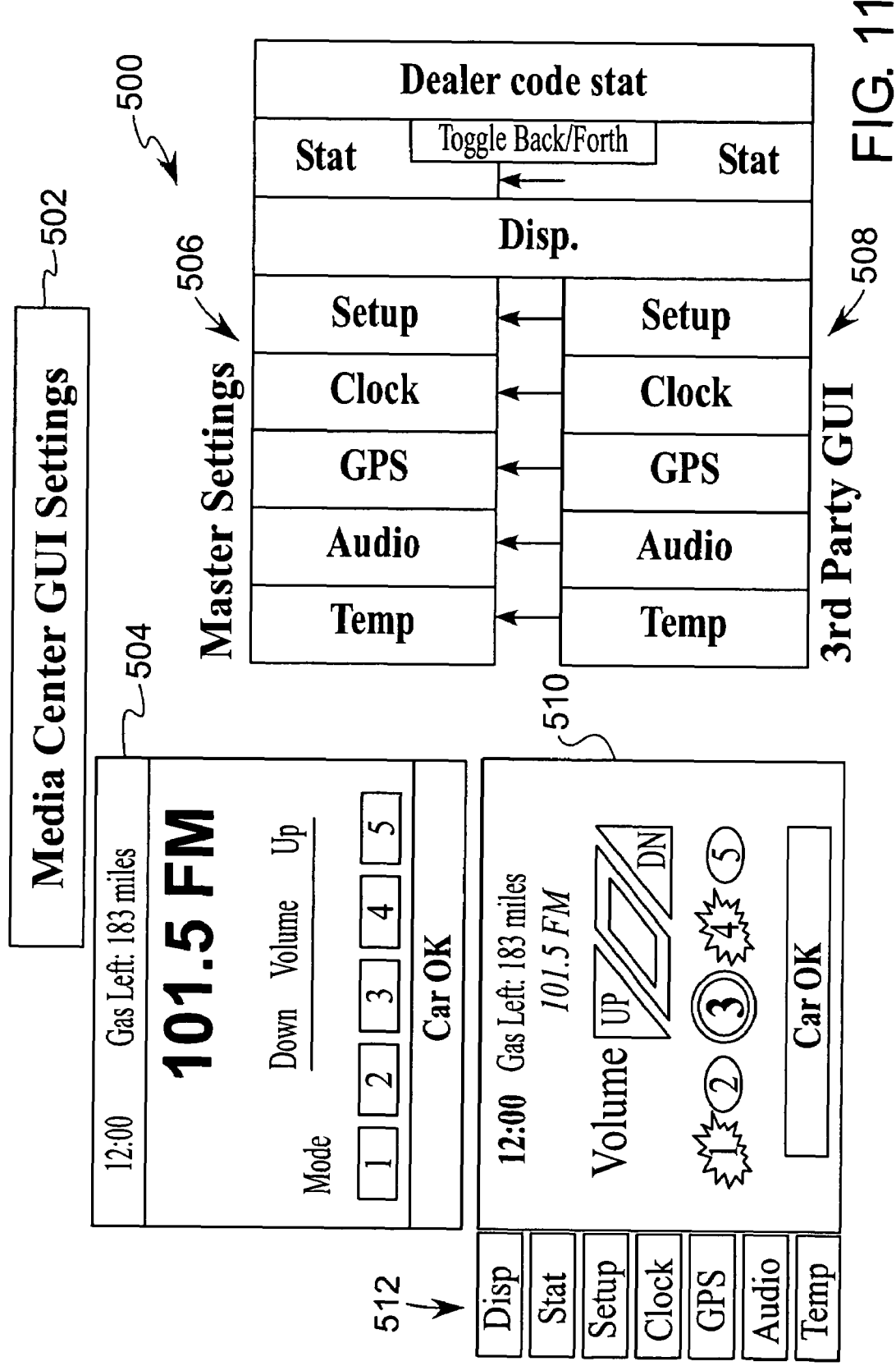
FIG. 11 is an exemplary template that may be used with the control and interconnection system to assist in integrating features of one or more peripherals into the control and interconnection system, e.g., during peripheral development.

Referring briefly to FIG. 11, an exemplary template 500 is illustrated. The template 500 illustrates one exemplary tool that can be provided, e.g., by the central domain A, for use by peripheral providers, e.g., OEMs or third party/after market providers, to easily and quickly generate a customized media center interface. Additional of different templates may be provided for other features and customizable aspects of the control and interconnection system. The template 500 includes a graphic user interface 502 implemented as an exemplary media center and settings display. The display can be easily accessed by peripherals 20 to display fuel data, time radio stations, temperature, audio, time information, meters, etc.

As an example, a generic master GUI 504 includes basic features, such as a display of the time, remaining fuel, current radio station, a plurality of control buttons and a status window, which currently indicates that the car operation is OK. The data to be displayed is derived from master settings data 506, which may reside in the memory of the control and interconnection system. However, a third party can customize the display using the provided template 500, e.g., by replacing the information stored in the master settings data 506 with customized setting data 508. Under this arrangement, the generic master display may be visually transformed to a desired appearance, one example of which is illustrated by the customized third party GUI 510. As illustrated, fonts have been changed, data has been moved or relocated about the displayable area, and icons have been added to emphasize a characteristic or feature of the various buttons and controls based upon third party GUI customization data from the customized setting data 508.

For example, as shown, five station presets are provided on the GUI. However, the icons for those presets have been customized to distinguish the stations with commercials, e.g., stations 1 and 4, from stations that play only music, e.g., stations 2 and 5. Further, the currently selected station, e.g., station 3, is visually distinguished with yet another customized icon. In this regard, a third party can customize the GUI 510 using the provided template without having to generate complete customized code by using the basic building blocks provided in the template 500 by modifying the information stored in the master settings data 506 with the third party customized setting data 508.

In the illustrative template example, the buttons 512, illustrated to the left side of the customized GUI 510 allow an operator to access various data including the temperature, control of audio, use of the GPS, clock etc. Such buttons 512 may be separate from the display screen or integrated into a touch screen. The setup button may influence the mission configuration control 138 and/or the mode control monitor 140 illustrated in FIG. 6. For example, an operator may utilize the setup to access mission configurations, e.g., to automatically adjust the mirror position, seat position, etc. Moreover, the template 500 may be configured to perform different functions depending upon one or more states of the vehicle as described in greater detail herein. However, when the vehicle is stopped or parked, graphics, pictures, maintenance information and other information may be displayed.

Further, various buttons 512, including the Disp (display) and Stat (statistics) may be used to access emergency road service, trailer tow status, suspension, start-up, remote options, morning/evening defrost, radio settings, temperature, seat provision, max speed, driving reports such as time/day, potholes detected, brake usage/skid detection, etc., anticipated charge cycles for hybrid vehicles, copies of the car manual or repair records may be displayed. Additionally, a special dealer/service password access code may be provided for diagnostics and extracting logged data.

Referring back to FIG. 10, at 412, design, development and market tools may be provided for system development. For example, evaluations and customer customization may be used and extended to support the full range of activities from product development, market research, to customer preference selection and performance scenarios, simulations and evaluation determinations. For example, the central domain may provide at least one design tool, such as a template that allows customization of a user interface. Design tools may also be provided to peripheral developers to allow them to develop and customize their peripheral(s) for use with the control and interconnection system 10, e.g., by defining information that characterizes capabilities of the peripheral such that the supervisory processor 106 of the system core 12 can oversee operation of the peripheral during operation and/or by defining information such as programming code and data such that an associated information processing workspace 116 can be configured to offload at least some peripheral processing to within the reconfigurable space 104 of the system core 12. Moreover, the design tools may allow each peripheral provider to describe proprietary configurations where such proprietary configurations are installed into an associated information processing workspace 116 outside of the visibility of other peripheral providers.

At 414, approval and compatibility certification of all supporting parties may be conducted for authorizing the peripheral as an approved peripheral to ensure compatibility with the control and interconnection system 10. One aspect to the business model 400 is the highly specialized customer treatment. To illustrate one example of how this may work, an exemplary franchise specialty store is considered. At 416, the central domain A provides customer advisors for corresponding available features of the control and interconnection system 10 to a particular customer, e.g., based upon a vehicle that a control and interconnection system 10 is to be installed into, available peripherals for that vehicle and customer preferences, such as may be identified as a number of different customer arrays that represent the focus of market concentration and product development as noted in the example below:

Targeted Customer Classes

Products, features and services may be bundled and marketed based upon previously identified demographics so that vehicle customization and preferential applications of the various technologies may be launched in a selective manner. The control and interconnection system 10 may be customized in terms of identified mission, e.g., nature of anticipated applications such as off-roading, towing, use as an industrial/work vehicle, vacation/travel vehicle, commuter vehicle, etc. Additionally, the control and interconnection system 10 may be customized based upon operator preference, e.g., seat, mirror and cabin comfort settings, electronics options preferred by the operator, etc. Still further, a combination of mission and operator customizations may be implemented. For example, an array of anticipated customer classes may be identified and various products, features and/or services may be bundled into each customer class based, for example, upon customer need, perceived need or desire. A few exemplary classes are set out in Table A, herein.

TABLE A

| Customer Classes | | | |
| --- | --- | --- | --- |
| Commuter | Young Family | Safety Oriented | Trades Company |
| Professional Parent | Older Adult | Frequent Traveler | New Young Adult |
| Vacation Package | College Grad/GI | High Performance | Miscellaneous |

As some examples, to the commuter class, features such as a music upgrade to include satellite radio, mp3, obstacle detection radar detection, GPS and real time traffic may be key aspects of interest. Comparatively, in a young family class, features such as a DVD player, video games, redundancy or division of controls throughout the vehicle cabin, obstacle detection, emergency road service, and remote/keyless start and/or entry may be key features of interest.

Still further, a trade or company may require 120VAC outlets via an appropriate 12VDC to 120VAC conversion, corresponding electrical system and power upgrades, dispatch/communication system, location and office data, email, GPS, PDA and other electronic tools, improved suspension and storage. For the vacation oriented class, trip destination, tow package, GPS, compass and navigation controls, on/off road optimization of vehicle performance, fuel optimization etc. may be the features of most interest. The performance class may be most interested in performance optimization, tuned and/or customizable suspension, handling and other performance characteristics, customizable displays and driving style adaptability.

All of the above classes may be addressed with the control and interconnection system 10. Moreover, a-la cart addition and subtraction of products, features and services may be easily provided as the particular customer prefers. As such, standard, premium and customized packages of features may be offered, depending upon the needs of the specific customer. Still further, utilizing a scalable approach, the reconfigurable processing environment 102 may be subsequently expanded, such as by adding an additional logic board 86 or by replacing, reconfiguring or updating components with the existing logic board plane 86, power board plane 88, flex circuit bus bar planes 90 and/or wiring plane 92.

Moreover, the above model allows a host of third party providers to offer products, features and services that are all independently developed, but qualified for operation on the system core 12. As such, quality and performance can be controlled while offering the capability of a wide variety of consumer features. Thus, OEM manufacturers, vehicle manufacturers and after-market manufactures can all participate on a common platform. Moreover, many permutations, combinations and features may be made available in a cost-effective manner, because certain redundant aspects of each product are provided by the control and interconnection system 10 according to various aspects of the present invention as noted in greater detail herein.

The central domain A may provide simulation and evaluation programs and feature array templates such as the template 500 discussed herein with reference to FIG. 11, to the franchise store. The location of such franchise stores may be strategically determined to be in step with lifestyle trends and demographic patterns.

At 416, a plurality of peripherals are identified that are approved by the central domain A for integration into a customized vehicle control system. For example, franchise personnel may establish a compatible set of options from available preferences, which are communicated back to the central domain A for electronic reprogramming of hardware and software components consistent with the selected set of options that have been special ordered for the customer. Alternatively, on-site customization may take place, e.g., by implementing stock modules in a store inventory of the particular franchise.

After the initial sales paperwork, if required, additional customization may be performed at 418. For example, the customer may be introduced to a features specialist or individual who is a trained expert in conducting evaluations of customer's interests and capabilities. In this regard, the franchise individual, specialist or other person assisting the customer may conduct a series of performance evaluations, e.g., by using a simulator, and optionally some simple vehicle evaluations.

The specialist may assist a customer in establishing a compatible set of options for a customer based upon a set of available preferences. For example, the control and interconnection system 10 may support certain features and peripherals that are not available on for implementation on all vehicles, e.g., tow packages, all or four wheel drive and other features that may be unique to certain vehicles or classes of vehicle, etc. As such, the trained feature specialist may be able to guide a customer through a list of peripherals, features and services that match the available features, services and peripherals to capabilities of vehicle.

Such evaluations need not be complex. For instance, with an intelligent programmable system like the control and interconnection system 10, pedal position and variable assist power steering efforts can be arranged together to find comfortable rest positions for the driver's heal & elbows not found in conventional isolated systems thus improving visibility and reducing vehicle operator fatigue. Furthermore, the vehicle tests may confirm improved dynamic vehicle handling and may result in higher satisfaction ratings owing to the process of the vehicle owner or operator being individually cared for. Many other system synergies can be found, such as display graphic size & night vision capabilities for an older adult. Any number of additional or alternative combinations may be implemented as set out in greater detail herein.

In response to receiving an order for a customized vehicle control system having identified at least one approved peripheral, a customization of a vehicle control system is initiated. At 420, a released design package process sends build requirements forward, e.g., in the form of engineering drawings and specifications or other suitable data configuration to the associated parties including to the central domain A, and optionally, to appropriate entities in the a strategic partners and third parties domain B. For example, at 422, the design package process may be sent to the appropriate strategic partners and/or third parties B, e.g., a low cost module manufacturer, which may be sufficient for circuit design and assembly but may exclude critical information held within the central domain A. In further response for receiving a request for a customized control and interconnection system 10, a selection may be made from at least two different system core configurations, each different system core configuration providing different processing capabilities, such as by selecting between a premium and standard core 12 as described in greater detail herein.

At 424, the central domain uses its non-public data to give a specific implementation of the control and interconnection system 10 for a specific customer its unique personality, e.g., by programming the configuration unique to the customer's order and/or by flashing the embedded memory with specific configuration, personal data and pertinent security information, e.g., to configure an associated information processing workspace 116 for each peripheral if required by that peripheral. The central domain or other entity under the control of the central entity may also install any necessary internal flexible wiring and performing final tests to ensure that the programming meets customer desires, such as by verifying operation of the peripherals with the control and interconnection system.

Thus, the central domain may maintain control over the customized programming of the information processing workspaces 116, electronically and otherwise wiring and testing of specific interconnections within the implementation of the control and interconnection system 10 that is unique to the specific customer while allowing developers and approved peripheral providers sufficient information to develop and deploy compatible and integrated products. The central entity further approves and integrates third party peripheral providers into the control and interconnection system by developing appropriate configuration data for each peripheral 20 so as to achieve a customized and responsive system based upon at least one of operator selection, operational conditions and environmental conditions.

At 426, additional hardware such as sensors, displays and wiring harnesses necessary to complete the vehicle installation is added, and then the system may pass through the central domain or other source for quality checks at 428 before shipping to a customer installation location. At 430, vehicle installation and system tests are conducted, e.g., at the ordering location, and at 432, the customer receives the vehicle customized with a control and interconnection system 10. At 434, continued/continual customer contact may be maintained though the control and interconnection system 10, e.g., to monitor customer satisfaction, identify new application possibilities and inform the customer of possible upgrades. Contacts may be maintained using any suitable communications means including real time connection to the installed control and interconnection system 10. For example, after a customization, the central domain occasionally receives information from a specific vehicle customization via the wireless transceiver 18 integrated with the system core 12.

Further, an entity, such as the central domain A, the user or another source may store backup data of the system configuration, such as the build requirements that are generated to describe a specific customization, e.g., to reload or rebuild the same or a different control and interconnection system based upon a particular, previously determined set of user preferences. For example, if the control and interconnection system 10 is damaged in a vehicle accident, upon repairs to the vehicle, the control and interconnection system may be replaced or repaired, and the user customization can be reprogrammed based upon data stored by either the user of another entity. Further, a user may carry a digital media storage device that contains preference data that may be loaded into the control and interconnection system, e.g., for vehicle operators who drive different vehicles from a fleet of similar vehicles. Further, the media can store medical alert and other non-vehicle specific information that can be stored in the vehicle by the control and interconnection system 10.

Still further, the nature of the control and interconnection system 10 allows a vehicle to be reprogrammed back to its factory default or otherwise different conditions, e.g., if being sold, traded or otherwise returned to a dealer, reseller or other entity. Similarly, if a user wishes to change vehicles, certain of the user parameters, e.g., those common to both the old and new vehicles, can be ported over to the new vehicle, with possibly only slight modification required to the new vehicle settings and hardware and software requirements of the new vehicle. By having the central domain A save special programming, it is possible to retrieve settings for an operator, e.g., if the system becomes damaged or inoperable, e.g., as a result of a vehicle accident, etc.

Having described the invention in detail and by reference to preferred embodiments thereof, it will be apparent that modifications and variations are possible without departing from the scope of the invention defined in the appended claims.

What I claim is:

1. A control and interconnection system for integrating a plurality of peripherals into a vehicle computer system comprising:
    a system core for processing data, an input module adapted to couple signals from associated vehicle peripherals to said system core and an output module adapted to direct signals from said system core to corresponding peripherals, wherein said system core comprises:
        a reconfigurable space that allocates hardware and software space within the system core among peripherals for offloading at least some peripheral processing requirements of the peripherals to said system core, said reconfigurable space having hardware for supporting reconfigurable hardware programming and memory for supporting reconfigurable software programming of peripheral-specific or application-specific functionalities that are not related to system core processes;
        supervisory control operatively configured to:
            provide control information to at least one peripheral associated with said control and interconnection system to coordinate performance characteristics of multiple peripherals based upon at least one determined operating condition;
            control the allocation of said reconfigurable space into a plurality of independent information processing workspaces, where each information processing workspace is defined by at least one of an allocated portion of said hardware for supporting reconfigurable hardware programming and an allocated portion of said memory for supporting reconfigurable software programming such that processing capabilities required by the associated peripheral are relocated from the peripheral to the corresponding information processing workspace of the system core; and
            control the configuration of each allocated information processing workspace based upon programming instructions that implement peripheral defined functionalities;
        a general purpose processor for interaction with said memory of said reconfigurable space and for executing functions of said system core; and
        a peripheral controller arranged to direct the flow of information in said control and interconnection system by communicating data between said input module, said output module, and at least one of said reconfigurable space and said general purpose processor, wherein select input signals at said input module are associated with their associated information processing workspace in said reconfigurable space of said system core.

2. The control and interconnection system according to claim 1, further comprising a logic plane for supporting said system core, a separate power board plane for providing power to said system core, a separate base wiring plane for supporting a plurality of connectors for coupling peripherals to said input and output modules and at least one flexible bus bar plane for bussing signals between said logic plane and said base wiring plane, and between said power board plane and said base wiring plane.

3. The control and interconnection system according to claim 2, wherein said power board plane further supplies power to at least one peripheral associated with said control and interconnection system.

4. The control and interconnection system according to claim 1, wherein said system core further comprises a data engine and a corresponding development library for supplying partially and/or completely defined building blocks to configure said information processing workspaces.

5. The control and interconnection system according to claim 1, further comprising a configuration library that interacts with said data engine to pass configuration data to at least one of said general purpose processor and said supervisory control.

6. The control and interconnection system according to claim 1, wherein:
said input module comprises reconfigurable hardware such that inputs of said input module can be rerouted to different paths within said system core; and
said output module comprises reconfigurable hardware such data paths from said system core can be rerouted to different outputs.

7. The control and interconnection system according to claim 1, wherein said at least one determined operating condition used by said supervisory control to provide control information to said at least one peripheral associated with said control and interconnection system to coordinate performance characteristics of multiple peripherals is based upon at least one of operator preference data, sensed operational conditions, inferred operational conditions, sensed environmental conditions and inferred environmental conditions.

8. The control and interconnection system according to claim 1, wherein said peripherals are arranged in a hierarchical grouping of classes and said supervisory control is further configured to oversee operating characteristics of each class based upon said at least one determined operating condition such that an overall configuration is customized.

9. The control and interconnection system according to claim 8, wherein said mode control monitor is configured to dynamically alter said at least one determined operating condition based upon at least one of entered preference data, sensed operational conditions, inferred operational conditions, sensed environmental conditions and inferred environmental conditions.

10. The control and interconnection system according to claim 8, wherein said hierarchical grouping of classes are defined by classes of vehicle components.

11. The control and interconnection system according to claim 8, wherein said hierarchical grouping of classes are defined by classes of home electronics components.

12. The control and interconnection system according to claim 1, wherein said input and said output modules communicate with associated peripherals over at least one of a direct connection or an indirect connection via an application appropriate bus.

* * * * *